(12) United States Patent
Dozier et al.

(10) Patent No.: US 12,735,986 B2
(45) Date of Patent: Sep. 15, 2026

(54) METAL COUPON WITH POROUS STRESS-RELIEF SECTION AND COMPONENT WITH SAME

(71) Applicant: GE Infrastructure Technology LLC, Greenville, SC (US)

(72) Inventors: Evan John Dozier, Greenville, SC (US); Nathan Nicholas Ostrout, Greenville, SC (US); Jacob Andrew Salm, Simpsonville, SC (US); Mark Lawrence Hunt, Greenville, SC (US); Stanley Frank Simpson, Greenville, SC (US); James Warren Pemrick, Troy, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 49 days.

(21) Appl. No.: 18/495,804

(22) Filed: Oct. 27, 2023

(65) Prior Publication Data

US 2025/0137373 A1 May 1, 2025

(51) Int. Cl.
*B32B 5/14* (2006.01)
*B22F 3/11* (2006.01)
(Continued)

(52) U.S. Cl.
CPC ................ *F01D 5/005* (2013.01); *B22F 3/11* (2013.01); *B22F 5/04* (2013.01); *B22F 5/10* (2013.01);
(Continued)

(58) Field of Classification Search
CPC .......... F01D 11/08; F01D 9/065; F01D 5/005; F01D 5/147; F01D 5/187; B22F 2999/00;
(Continued)

(56) References Cited

U.S. PATENT DOCUMENTS

| | | | |
|---|---|---|---|
| 653,280 | A | 7/1900 | Barthels et al. |
| 3,031,996 | A | 5/1962 | Botvin |

(Continued)

FOREIGN PATENT DOCUMENTS

| | | | |
|---|---|---|---|
| CA | 2731756 | C | 4/2016 |
| CN | 101626862 | A | 1/2010 |

(Continued)

OTHER PUBLICATIONS

Machine Translation, Kaiser, EP 2450471A1, Sep. 5, 2012. (Year: 2012).*

(Continued)

*Primary Examiner* — Michael E. La Villa
(74) *Attorney, Agent, or Firm* — James Pemrick; Charlotte Wilson; Hoffman Warnick LLC

(57) ABSTRACT

A component including a body, and an additively manufactured (AM) metal coupon including a first section and a stress-relief section, is disclosed. The stress-relief section includes a porous region having a porosity between 2% to 50% open space volume to total volume of the stress-relief section. The stress-relief section has at least one of thermal conductivity, tensile strength, ductility, or fatigue strength less than first section. A braze material couples the AM metal coupon to a coupon opening in the body. The stress-relief section creates a low-stress zone in the metal coupon that can be located near or adjacent to a high-stress zone. The stress-relief section reduces residual stress in the metal coupon, which reduces the related challenges of coupling the metal coupon to the body of the component, especially where superalloy materials are used.

21 Claims, 17 Drawing Sheets

(51) Int. Cl.

| | |
|---|---|
| ***B22F 5/04*** | (2006.01) |
| ***B22F 5/10*** | (2006.01) |
| ***B22F 7/00*** | (2006.01) |
| ***B22F 7/02*** | (2006.01) |
| ***B22F 7/06*** | (2006.01) |
| ***B22F 10/20*** | (2021.01) |
| ***B22F 10/28*** | (2021.01) |
| ***B22F 10/38*** | (2021.01) |
| ***B23K 1/00*** | (2006.01) |
| ***B23P 6/00*** | (2006.01) |
| ***B23P 6/04*** | (2006.01) |
| ***B32B 5/16*** | (2006.01) |
| ***B32B 5/18*** | (2006.01) |
| ***B32B 5/22*** | (2006.01) |
| ***B32B 15/01*** | (2006.01) |
| ***B32B 15/04*** | (2006.01) |
| ***B33Y 70/00*** | (2020.01) |
| ***F01D 5/00*** | (2006.01) |
| ***F01D 5/14*** | (2006.01) |
| ***F01D 5/18*** | (2006.01) |
| ***F01D 9/06*** | (2006.01) |
| ***F01D 11/08*** | (2006.01) |
| *B23K 101/00* | (2006.01) |
| *B33Y 10/00* | (2015.01) |
| *B33Y 80/00* | (2015.01) |

(52) U.S. Cl.

CPC ................ *B22F 7/002* (2013.01); *B22F 7/02* (2013.01); *B22F 7/06* (2013.01); *B22F 7/062* (2013.01); *B22F 10/20* (2021.01); *B22F 10/28* (2021.01); *B22F 10/38* (2021.01); *B23K 1/0018* (2013.01); *B23P 6/002* (2013.01); *B23P 6/005* (2013.01); *B23P 6/045* (2013.01); *B32B 5/14* (2013.01); *B32B 5/142* (2013.01); *B32B 5/145* (2013.01); *B32B 5/16* (2013.01); *B32B 5/18* (2013.01); *B32B 5/22* (2013.01); *B32B 15/01* (2013.01); *B32B 15/043* (2013.01); *B32B 15/046* (2013.01); *B33Y 70/00* (2014.12); *F01D 5/147* (2013.01); *F01D 5/187* (2013.01); *F01D 9/065* (2013.01); *F01D 11/08* (2013.01); *B22F 2007/068* (2013.01); *B22F 2999/00* (2013.01); *B23K 2101/001* (2018.08); *B33Y 10/00* (2014.12); *B33Y 80/00* (2014.12); *F05D 2230/22* (2013.01); *F05D 2230/234* (2013.01); *F05D 2230/30* (2013.01); *F05D 2240/11* (2013.01); *F05D 2240/121* (2013.01); *F05D 2240/122* (2013.01); *F05D 2240/303* (2013.01); *F05D 2240/304* (2013.01); *F05D 2240/80* (2013.01); *F05D 2250/11* (2013.01); *F05D 2250/12* (2013.01); *F05D 2250/23* (2013.01); *F05D 2250/294* (2013.01); *F05D 2250/75* (2013.01); *F05D 2260/2212* (2013.01); *F05D 2260/2214* (2013.01); *F05D 2260/941* (2013.01); *F05D 2300/514* (2013.01); *Y02P 10/25* (2015.11); *Y10T 428/12229* (2015.01); *Y10T 428/12458* (2015.01); *Y10T 428/12479* (2015.01); *Y10T 428/12493* (2015.01); *Y10T 428/12986* (2015.01)

(58) Field of Classification Search

CPC ...... B22F 3/11; B22F 5/04; B22F 5/10; B22F 7/002; B22F 7/02; B22F 7/06; B22F 7/062; B22F 10/20; B22F 10/28; B22F 10/38; B22F 2007/068; B23K 1/0018; B23K 2101/001; B23P 6/002; B23P 6/005; B23P 6/045; B33Y 70/00; B33Y 10/00; B33Y 80/00; F05D 2230/22; F05D 2230/234; F05D 2230/30; F05D 2240/11; F05D 2240/121; F05D 2240/122; F05D 2240/303; F05D 2240/304; F05D 2240/80; F05D 2250/11; F05D 2250/12; F05D 2250/23; F05D 2250/294; F05D 2250/75; F05D 2260/2214; F05D 2260/941; F05D 2300/514; Y02P 10/25; B32B 5/14; B32B 5/142; B32B 5/145; B32B 5/16; B32B 5/18; B32B 5/22; B32B 15/01; B32B 15/046; B32B 15/043; Y10T 428/12229; Y10T 428/12458; Y10T 428/12479; Y10T 428/12986; Y10T 428/12493

See application file for complete search history.

(56) References Cited

U.S. PATENT DOCUMENTS

| | | | |
|---|---|---|---|
| 4,195,764 | A | 4/1980 | Bogart |
| 5,156,321 | A | 10/1992 | Liburdi et al. |
| 5,511,721 | A | 4/1996 | Demo et al. |
| 5,775,402 | A | 7/1998 | Sachs et al. |
| 6,199,746 | B1 | 3/2001 | Dupree et al. |
| 6,413,650 | B1 | 7/2002 | Dupree et al. |
| 7,635,078 | B2 | 12/2009 | Ariga et al. |
| 8,042,723 | B2 | 10/2011 | Holi |
| 9,873,171 | B2 | 1/2018 | Li et al. |
| 10,006,293 | B1 | 6/2018 | Jones |
| 10,228,138 | B2 | 3/2019 | Theuer et al. |
| 10,384,787 | B2 | 8/2019 | Gordon et al. |
| 10,456,849 | B2 | 10/2019 | Eminoglu |
| 10,767,489 | B2 | 9/2020 | Bunker |
| 10,975,719 | B2 | 4/2021 | Ucok et al. |
| 11,001,002 | B2 | 5/2021 | Kulinsky |
| 11,577,317 | B2 | 2/2023 | Hart et al. |
| 11,712,738 | B2 | 8/2023 | Ozbaysal et al. |
| 2004/0134887 | A1 | 7/2004 | Murphy |
| 2007/0084047 | A1 | 4/2007 | Lange et al. |
| 2009/0229101 | A1 | 9/2009 | Ahmad |
| 2010/0239412 | A1 | 9/2010 | Draper |
| 2011/0099810 | A1 | 5/2011 | Stankowski et al. |
| 2011/0180589 | A1 | 7/2011 | Tuppen et al. |
| 2012/0003086 | A1 | 1/2012 | Morris et al. |
| 2013/0086785 | A1 | 4/2013 | Cui et al. |
| 2013/0104397 | A1 | 5/2013 | Bunker |
| 2013/0108460 | A1 | 5/2013 | Szwedowicz et al. |
| 2013/0115091 | A1 | 5/2013 | Bruck |
| 2014/0020823 | A1 | 1/2014 | Montross |
| 2014/0072448 | A1 | 3/2014 | Prue et al. |
| 2014/0111956 | A1 | 4/2014 | Taniguchi |
| 2014/0259666 | A1 | 9/2014 | Baughman et al. |
| 2014/0321994 | A1 | 10/2014 | Brzek |
| 2014/0329043 | A1 | 11/2014 | Shigetomi |
| 2015/0093566 | A1 | 4/2015 | Bell |
| 2015/0111060 | A1 | 4/2015 | Kottilingam |
| 2015/0147164 | A1 | 5/2015 | Cui et al. |
| 2015/0283642 | A1 | 10/2015 | Forsdike et al. |
| 2016/0059364 | A1 | 3/2016 | Huxol |
| 2016/0090848 | A1 | 3/2016 | Engeli et al. |
| 2016/0115571 | A1 | 4/2016 | Kestler et al. |
| 2016/0214176 | A1 | 7/2016 | Bruck et al. |
| 2016/0325368 | A1 | 11/2016 | Landwehr et al. |
| 2017/0029088 | A1 | 2/2017 | Gruner |
| 2017/0108216 | A1 | 4/2017 | Taniguchi et al. |
| 2017/0284206 | A1 | 10/2017 | Roberts |
| 2017/0328207 | A1 | 11/2017 | Bunker |
| 2018/0010457 | A1 | 1/2018 | Chabane et al. |
| 2018/0010458 | A1 | 1/2018 | Chabane et al. |
| 2018/0023403 | A1 | 1/2018 | Jones et al. |
| 2018/0161902 | A1 | 6/2018 | Cui et al. |
| 2018/0180329 | A9 | 6/2018 | Conrad et al. |

(56) References Cited

U.S. PATENT DOCUMENTS

| | | | |
|---|---|---|---|
| 2018/0187564 | A1 | 7/2018 | Cui et al. |
| 2018/0200817 | A1 | 7/2018 | Henderson et al. |
| 2018/0320270 | A1 | 11/2018 | Nardi |
| 2018/0339354 | A1 | 11/2018 | Eminoglu et al. |
| 2018/0345415 | A1 | 12/2018 | Whims |
| 2019/0054567 | A1 | 2/2019 | Roerig et al. |
| 2019/0284942 | A1 | 9/2019 | Tanigawa et al. |
| 2019/0329344 | A1 | 10/2019 | Eminoglu et al. |
| 2019/0345826 | A1 | 11/2019 | Packer et al. |
| 2020/0047253 | A1 | 2/2020 | Thomas et al. |
| 2020/0072078 | A1 | 3/2020 | Decesare et al. |
| 2020/0149403 | A1 | 5/2020 | Kottilingam et al. |
| 2020/0149407 | A1 | 5/2020 | Kottilingam et al. |
| 2020/0254547 | A1 | 8/2020 | Puidokas et al. |
| 2020/0254548 | A1 | 8/2020 | Xu et al. |
| 2020/0384560 | A1 | 12/2020 | Rebbecchi, Jr. et al. |
| 2021/0114110 | A1 | 4/2021 | Sercombe et al. |
| 2021/0146459 | A1 | 5/2021 | Gold et al. |
| 2021/0146485 | A1 | 5/2021 | Bulgrin et al. |
| 2021/0154956 | A1 | 5/2021 | Schubel et al. |
| 2021/0246534 | A1 | 8/2021 | Cui et al. |
| 2022/0136395 | A1 | 5/2022 | Ozbaysal et al. |
| 2022/0234101 | A1 | 7/2022 | Ozbaysal et al. |
| 2022/0333494 | A1 | 10/2022 | Subramanian et al. |
| 2022/0347928 | A1 | 11/2022 | Truxel et al. |
| 2022/0402031 | A1 | 12/2022 | Hann et al. |
| 2023/0145370 | A1 | 5/2023 | Dyson |
| 2024/0082919 | A1 | 3/2024 | Daulton et al. |
| 2024/0082938 | A1 | 3/2024 | Daulton et al. |
| 2024/0082939 | A1 | 3/2024 | Daulton et al. |
| 2025/0135533 | A1 | 5/2025 | Salm et al. |
| 2025/0135545 | A1 | 5/2025 | Pemrick et al. |
| 2025/0135566 | A1 | 5/2025 | Simpson et al. |
| 2025/0135567 | A1 | 5/2025 | Simpson et al. |
| 2025/0135588 | A1 | 5/2025 | Salm et al. |
| 2025/0135749 | A1 | 5/2025 | Simpson et al. |
| 2025/0135751 | A1 | 5/2025 | Macmillan et al. |
| 2025/0137373 | A1 | 5/2025 | Dozier et al. |
| 2025/0137387 | A1 | 5/2025 | Hunt et al. |

FOREIGN PATENT DOCUMENTS

| | | | |
|---|---|---|---|
| CN | 108393648 | A | 8/2018 |
| CN | 113430414 | A | 9/2021 |
| CN | 116532909 | A | 8/2023 |
| CN | 119489203 | A | 2/2025 |
| CN | 119604401 | A | 3/2025 |
| CN | 119897464 | A | 4/2025 |
| CN | 119897467 | A | 4/2025 |
| CN | 119897480 | A | 4/2025 |
| CN | 119897481 | A | 4/2025 |
| DE | 102014224410 | A1 | 6/2016 |
| DE | 10 2018 218017 | A1 | 4/2020 |
| EP | 1074331 | A1 | 2/2001 |
| EP | 1127648 | A2 | 8/2001 |
| EP | 2078579 | A1 | 7/2009 |
| EP | 2450471 | A1 | 5/2012 |
| EP | 3360637 | A1 | 8/2018 |
| EP | 3508686 | A1 | 7/2019 |
| EP | 3693115 | A1 | 8/2020 |
| EP | 4545208 | A1 | 4/2025 |
| EP | 4545208 | A2 | 4/2025 |
| EP | 4545209 | A1 | 4/2025 |
| EP | 4545212 | A1 | 4/2025 |
| JP | 2022542180 | A | 9/2022 |
| TW | 1670166 | B | 9/2019 |
| WO | 2020014677 | A1 | 1/2020 |
| WO | 2020145971 | A1 | 7/2020 |
| WO | 2021247970 | A1 | 12/2021 |

OTHER PUBLICATIONS

Non-Final Office Action dated May 9, 2025 for related U.S. Appl. No. 18/495,808, 16 pages.

EP Search Report for EP Application No. 24204162.2, dated Mar. 14, 2025, 11 pages.

Final Office Action for related U.S. Appl. No. 18/495,803, dated Mar. 19, 2025, 26 pages.

Non-Final Office Action dated Apr. 21, 2025 for related U.S. Appl. No. 18/495,816, 29 pages.

EP Search Report for EP Application No. 24204157.2, dated Mar. 14, 2025, 11 pages.

EP Search Report for EP Application No. 24204160.6, dated Apr. 16, 2025, 12 pages.

EP Search Report for EP Application No. 24204462.6, dated Apr. 1, 2025, 10 pages.

EP Search Report for EP Application No. 24204155.6, dated Apr. 2, 2025, 10 pages.

EP Search Report for EP Application No. 24204158.0, dated Mar. 19, 2025, 10 pages.

EP Search Report for EP Application No. 24204153.1, dated Mar. 3, 2025, 11 pages.

EP Search Report for EP Application No. 24204463.4, dated Apr. 22, 2025, 10 pages.

EP Search Report for EP Application No. 24204461.8, dated Mar. 14, 2025, 11 pages.

EP Search Report for EP Application No. 24204154.9, dated Mar. 19, 2025, 13 pages.

EP Search Report for EP Application No. 24204161.4, dated Mar. 14, 2025, 14 pages.

EP Search Report for EP Application No. 24204156.4, dated Mar. 18, 2025, 13 pages.

Office Action (Non-Final Rejection) dated Sep. 4, 2025 for U.S. Appl. No. 18/495,818 (pp. 1-13).

EP Search Report for EP Application No. 24223562.0, dated Jul. 8, 2025, 7 pages.

Office Action (Final Rejection) dated Sep. 26, 2025 for related U.S. Appl. No. 18/495,808, 17 pages.

Non-Final Office Action issued in App. No. U.S. Appl. No. 18/495,803, dated Nov. 14, 2024, 26 pages.

Office Action (Non-Final Rejection) dated Jul. 28, 2025 for related U.S. Appl. No. 18/417,625, 16 pages.

Office Action (Final Rejection) dated Aug. 8, 2025 for related U.S. Appl. No. 18/495,816, 15 pages.

Notice of Allowance and Fees Due dated Aug. 5, 2025 for related U.S. Appl. No. 18/495,817, 9 pages.

Office Action (Non-Final Rejection) dated Aug. 11, 2025 for related U.S. Appl. No. 18/495,809, 13 pages.

Office Action (Non-Final Rejection) dated Aug. 12, 2025 for related U.S. Appl. No. 18/495,810, 14 pages.

EP Search Report for EP Application No. 24223553.9, dated Nov. 17, 2025, 9 pages.

Glossary of Metallurgical and Metalworking Terms, ASM Handbook, 1998 (Year: 1998), pp. 1 and 52.

Notice of Allowance and Fees Due dated Dec. 9, 2025 for U.S. Appl. No. 18/417,625, 9 pages.

Notice of Allowance and Fees Due dated Dec. 22, 2025 for U.S. Appl. No. 18/495,807, 8 pages.

Office Action (Non-Final Rejection) dated Nov. 24, 2025 for U.S. Appl. No. 18/495,816, 22 pages.

Office Action (Non-Final Rejection) dated Apr. 8, 2026 for U.S. Appl. No. 18/495,811, 12 pages.

Office Action (Non-Final Rejection) dated May 4, 2026 for U.S. Appl. No. 18/495,814, 11 pages.

Office Action (Notice of Allowance and Fees Due dated Apr. 17, 2026 for U.S. Appl. No. 18/495,812, 8 pages.

Office Action (Non-Final Rejection) dated May 12, 2026 for U.S. Appl. No. 18/495,809, 10 pages.

Office Action (Notice of Allowance and Fees Due) dated May 8, 2026 for U.S. Appl. No. 18/495,818, 12 pages.

Notice of Allowance and Fees Due dated Jan. 21, 2026 for U.S. Appl. No. 18/495,808, 10 pages.

Notice of Allowance and Fees Due dated Dec. 31, 2025 for U.S. Appl. No. 18/495,810, 11 pages.

Office Action (Final Rejection) dated Dec. 31, 2025 for U.S. Appl. No. 18/495,809, 13 pages.

(56) References Cited

OTHER PUBLICATIONS

Office Action (Non-Final Rejection) dated Jan. 8, 2026 for U.S. Appl. No. 18/495,812, 9 pages.
Office Action (Final Rejection) dated Feb. 2, 2026 for U.S. Appl. No. 18/495,818, 13 pages.

* cited by examiner 200
306
302
294
296
340
300C
292
290
308

200
306
322
300A
322
294A
302
312A
296
325
312B
294B
300B
292
308
290
324

200
306
322
300A
322
294A
302
312A
310
296
310
325
312B
294B
300B
292
308
290
324

204
184
206
126, 202

300A
204
300B
200
184
206
126, 202

325
320
184
206
126, 202
200
204
300B
300A 310
300A
204
126, 202
206
300B
200

METAL COUPON WITH POROUS STRESS-RELIEF SECTION AND COMPONENT WITH SAME

TECHNICAL FIELD

The disclosure relates generally to component repair, and more specifically, to component repair using a metal coupon with a porous stress-relief section.

BACKGROUND

Industrial components occasionally require repair. For example, hot gas path components that are used in turbomachines to direct a working fluid to create energy may require repair. Hot gas path components can take a variety of forms, such as turbine rotor blades or stationary vanes, that include airfoils that direct a working fluid to create energy. Rotor blades are coupled to and act to turn a turbine rotor, and stationary vanes are coupled to a casing of the turbomachine to direct the working fluid towards the rotor blades.

Additive manufacturing, such as direct metal laser melting (DMLM) or selective laser melting (SLM), has emerged as a reliable manufacturing method for making industrial components. The advent of additive manufacturing techniques has also provided the ability to replace sections of components such as part of a leading or trailing edge of a turbomachine nozzle. For example, a portion of a leading edge of a turbomachine nozzle may be removed, leaving a cutout in the nozzle, and a new section (referred to herein as a "coupon") may be coupled in the cutout. The coupon is additively manufactured to have a shape that at least generally matches that of the cutout. The coupon can replace a section of a used turbomachine nozzle or be added as part of a new turbomachine nozzle.

The component and metal coupons are typically made of a high temperature superalloy. Additive manufacture of metal coupons using superalloys without embedding a residual stress is a challenge. More particularly, after additive manufacture, the metal coupon may experience a residual stress-inducing phenomenon, sometimes referred to as "strain age cracking" or "ductility dip cracking," that occurs due to gamma prime precipitation during the post-sintering heat treatment of the superalloy. Similar phenomenon can also occur in other metals or metal alloys. The allowable stress that can occur without stress-related defects arising, e.g., cracking, varies depending on metal or metal alloy used. In any event, the residual stress in the metal coupon can result in stress-related defects that make coupling the metal coupon and component together very challenging.

BRIEF DESCRIPTION

All aspects, examples and features mentioned below can be combined in any technically possible way.

An aspect of the disclosure provides a metal coupon, comprising: an additively manufactured (AM) metal member including a first section having a first porosity and a stress-relief section having a second porosity, the second porosity between 2% to 50% open space volume to total volume of the stress-relief section, the first porosity is different than the second porosity; and wherein the stress-relief section has at least one of thermal conductivity, tensile strength, ductility or fatigue strength less than the first section.

Another aspect of the disclosure includes any of the preceding aspects, and further comprising a braze material infiltrated into the stress-relief section.

Another aspect of the disclosure includes any of the preceding aspects, and further comprising a crack in the first section and wherein the crack stops at the stress-relief section, wherein the braze material infiltrates the crack.

Another aspect of the disclosure includes any of the preceding aspects, and the stress-relief section is fully embedded within the AM metal member.

Another aspect of the disclosure includes any of the preceding aspects, and the stress-relief section includes a first portion within the first section and a second portion extending to an exterior surface of the AM metal member.

Another aspect of the disclosure includes any of the preceding aspects, and further comprising a braze material infiltrated into the stress-relief section.

Another aspect of the disclosure includes any of the preceding aspects, and further comprising a crack in the first section, wherein the crack stops at the stress-relief section, wherein the braze material infiltrates the crack.

Another aspect of the disclosure includes any of the preceding aspects, and the stress-relief section is within a single layer of the AM metal member.

Another aspect of the disclosure includes any of the preceding aspects, and the single layer of the AM metal member extends only partially across the AM metal member.

Another aspect of the disclosure includes any of the preceding aspects, and the stress-relief section extends at least partially across layers of the AM metal member.

Another aspect of the disclosure includes any of the preceding aspects, and the stress-relief section includes a first sub-section having a first porous region and a second sub-section having a second porous region, each of the first and second porous regions having a porosity between 2% to 50% open space volume to total volume of the respective porous region, and wherein the first porous region has a different porosity than the second porous region; and wherein the first sub-section and the second sub-section have a difference between at least one of thermal conductivity, ductility or fatigue strength.

Another aspect includes a component, comprising: a body; an additively manufactured (AM) metal coupon including a first section and a stress-relief section, the stress-relief section having a porosity between 2% to 50% open space volume to total volume of the stress-relief section, wherein the stress-relief section has at least one of thermal conductivity, ductility or fatigue strength less than the first section; and a braze material coupling the AM metal coupon to a coupon opening in the body.

Another aspect of the disclosure includes any of the preceding aspects, and the braze material infiltrates into the stress-relief section.

Another aspect of the disclosure includes any of the preceding aspects, and further comprising a crack in the first section, wherein the crack stops at the stress-relief section, wherein the braze material infiltrates the crack.

Another aspect of the disclosure includes any of the preceding aspects, and the stress-relief section is fully embedded within the AM metal coupon.

Another aspect of the disclosure includes any of the preceding aspects, and the stress-relief section includes a first sub-section within the first section and a second sub-section extending to an exterior surface of the AM metal coupon.

Another aspect of the disclosure includes any of the preceding aspects, and further comprising a braze material infiltrated into the stress-relief section.

Another aspect of the disclosure includes any of the preceding aspects, and further comprising a crack in the first section, wherein the crack stops at the stress-relief section, wherein the braze material infiltrates the crack.

Another aspect of the disclosure includes any of the preceding aspects, and the stress-relief section is within a single layer of the AM metal coupon.

Another aspect of the disclosure includes any of the preceding aspects, and the single layer of the AM metal member extends only partially across the AM metal member.

Another aspect of the disclosure includes any of the preceding aspects, and the stress-relief section extends at least partially across layers of the AM metal coupon.

Another aspect includes a method of forming a metal coupon for repairing a component, the method comprising: additively manufacturing a metal coupon with an additive manufacturing (AM) system by successively depositing and fusing together layers of a metal powder, the metal coupon including a first section and a stress-relief section, the stress-relief section having a porosity between 2% to 50% open space volume to total volume of the stress-relief section, and wherein the stress-relief section has at least one of thermal conductivity, ductility or fatigue strength less than first section.

Another aspect of the disclosure includes any of the preceding aspects, and the stress-relief section is within a single layer of the metal coupon.

Another aspect of the disclosure includes any of the preceding aspects, and wherein the single layer of the AM metal member extends only partially across the AM metal member.

Another aspect of the disclosure includes any of the preceding aspects, and the additive manufacturing includes using one or more melting beams to fuse together the layers of the metal powder, and further comprising adjusting an amount of overlap of a melting area of the one or more melting beams to control the porosity of the stress-relief section.

Another aspect of the disclosure includes any of the preceding aspects, and further comprising: positioning the metal coupon to a coupon opening in a body of the component; and infiltrating the metal coupon with a braze material to couple the metal coupon to the coupon opening in the body.

Another aspect of the disclosure includes any of the preceding aspects, and further comprising infiltrating a braze material into the stress-relief section.

Another aspect of the disclosure includes any of the preceding aspects, and the stress-relief section includes a first sub-section within the first section and a second sub-section extending to an exterior surface of the metal coupon, and the infiltrating includes infiltrating the braze material into the first and second sub-sections.

Another aspect of the disclosure includes any of the preceding aspects, and the first section includes a crack, wherein the crack stops at the stress-relief section, wherein the infiltrating includes infiltrating the braze material into the crack.

Another aspect of the disclosure includes any of the preceding aspects, and further comprising identifying a high-stress zone in the metal coupon, the high-stress zone having higher stress compared to other regions of the metal coupon, wherein the additive manufacturing includes forming the stress-relief section in or adjacent to the high-stress zone in the metal coupon.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
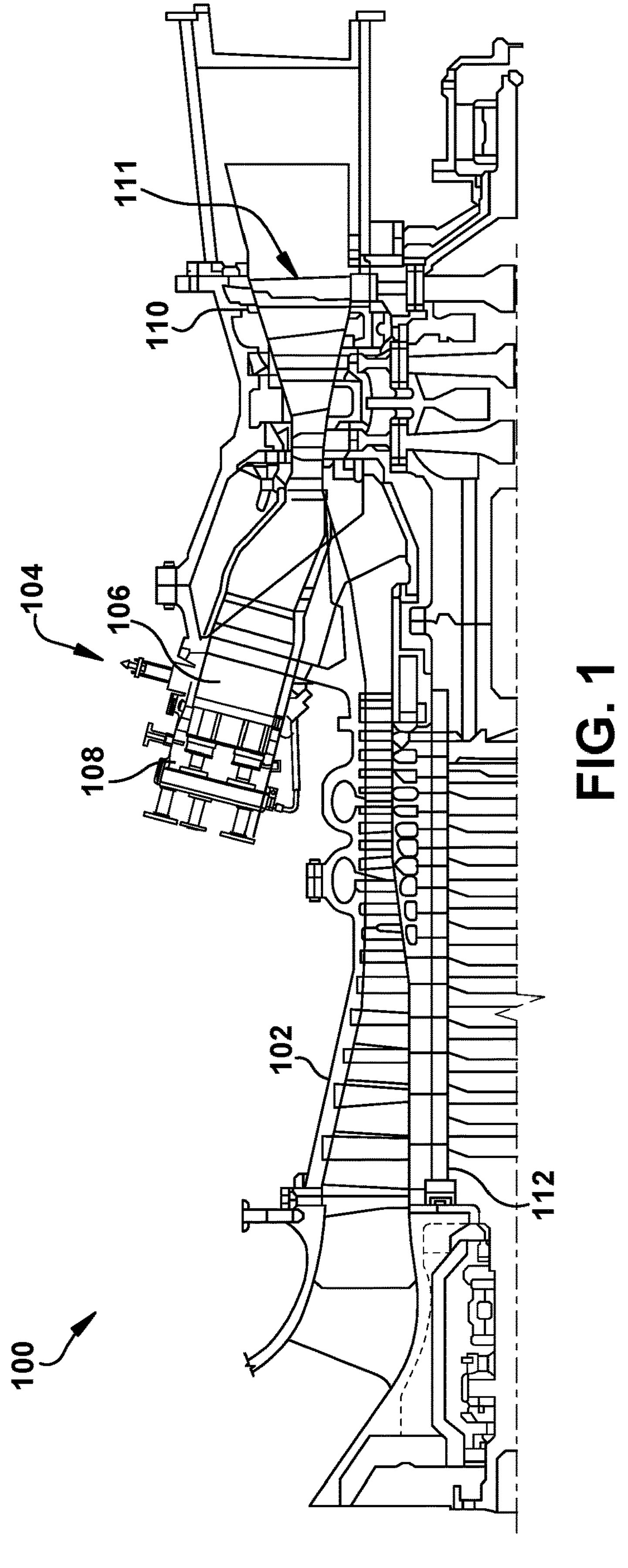
FIG. 1 shows a schematic view of an illustrative industrial machine in the form of a gas turbine system and including a component according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," an, and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides a component including a body, and an additively manufactured (AM) metal coupon including a first section and a stress-relief section. The first section has a first porosity, and the stress-relief section has a second porosity. The first porosity and the second porosity are different. The second porosity may be between 2% to 50% open space volume to total volume of the stress-relief section. The stress-relief section has at least one of thermal conductivity, ductility or fatigue strength less than first section. A "coupon" as used herein may include any part configured to be positioned in a coupon opening in a body of the component as part of original manufacture or repair, i.e., it is an insertable part. The component may also include a braze material coupling the AM metal coupon to a coupon opening in the body. The stress-relief section including the second porosity, i.e., porous region, creates a low-stress zone in the metal coupon that can be located near or adjacent to a high-stress zone. Where superalloys are used, the high-stress zone may be present due to gamma prime precipitation during the post-sintering heat reduction of the superalloy. Regardless of the metal or metal alloy used, the stress-relief section has less cross-sectional area and volume of melted particles than in an adjacent first section, which reduces the amount of adjacent material contracting as the coupon cools and thus reduces the amount of residual stress. The stress-relief section also retains less heat and is more flexible than the adjacent first section with a high-stress zone. The stress-relief section allows reduction in residual stress in the metal coupon and stress-related defects, making coupling the metal coupon and component together less challenging.

FIG. 1 shows a schematic illustration of an illustrative industrial machine, which may include a component according to teachings of the disclosure. In the example, the machine includes a turbomachine 100 in the form of a combustion or gas turbine (GT) system. Turbomachine 100 includes a compressor 102 and a combustor 104. Combustor 104 includes a combustion region 106 and a fuel nozzle assembly 108. Turbomachine 100 also includes a turbine assembly 110 and a common compressor/turbine shaft or rotor 112. In one embodiment, turbomachine 100 is a 7HA.03 engine, commercially available from GE Vernova. The present disclosure is not limited to any one particular GT system and may be implemented in connection with other engines including, for example, the other HA, F, B, LM, GT, TM and E-class engine models of GE Vernova, and engine models of other companies. Furthermore, the present disclosure is not limited to any particular turbomachine, and may be applicable to, for example, steam turbines, jet engines, compressors, turbofans, etc. Moreover, the present disclosure is not limited to any particular turbomachine component and may be applicable to any industrial component that employs coupons during manufacture or repair.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine 111 that rotatably couples to and drives rotor 112. Compressor 102 also is rotatably coupled to rotor 112. In the illustrative embodiment, there are a plurality of combustors and fuel nozzle assemblies 108.

Figure 2:
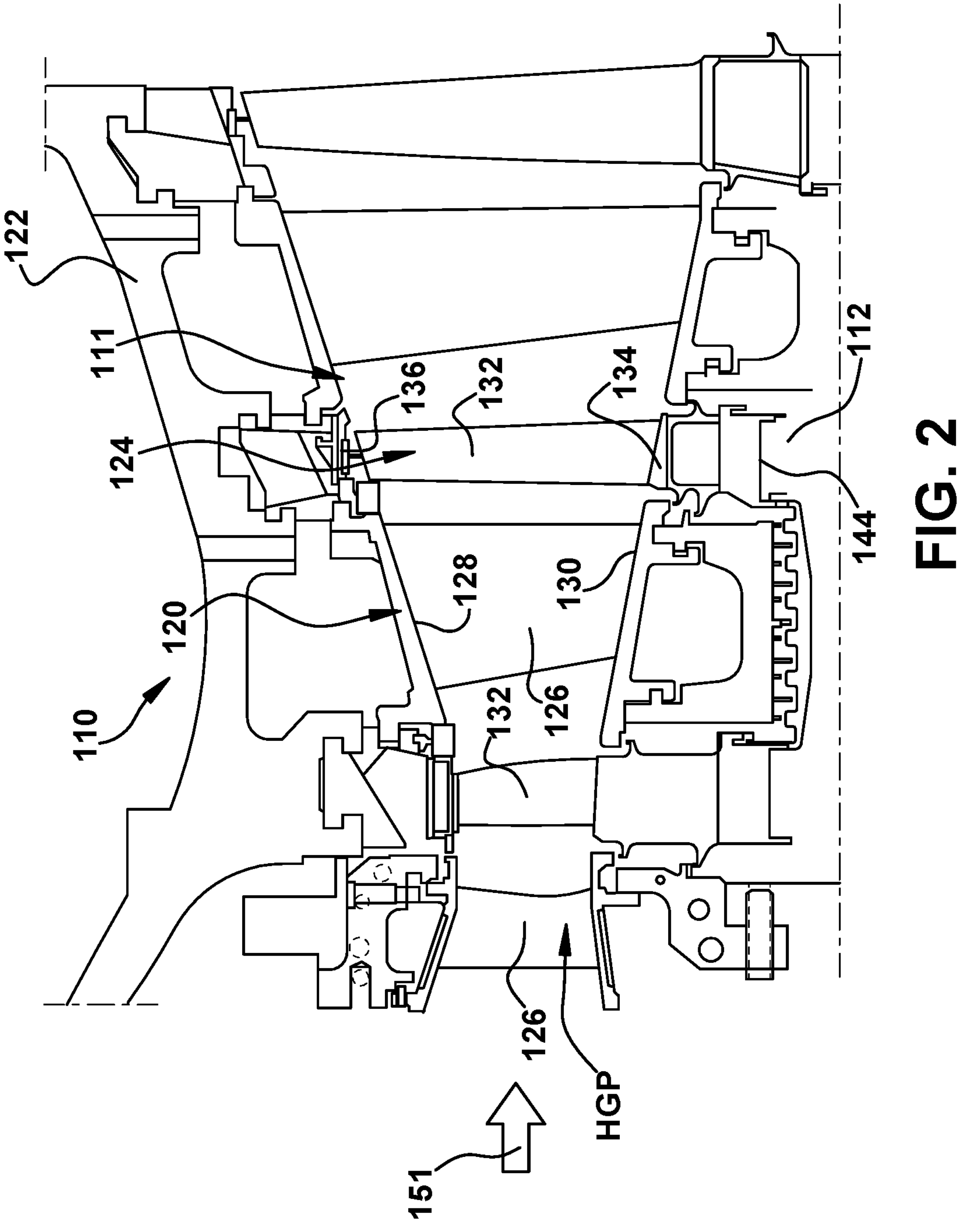
FIG. 2 shows a cross-sectional view of an illustrative gas turbine assembly that may be used with the gas turbine system in FIG. 1 and including a component according to embodiments of the disclosure.

FIG. 2 shows a cross-sectional view of an illustrative turbine assembly 110 of turbomachine 100 (FIG. 1) that may be used with the gas turbine system in FIG. 1. Turbine 111 of turbine assembly 110 includes a row of nozzle or vanes 120 coupled to a stationary casing 122 of turbomachine 100 and axially adjacent a row 124 of rotating blades 132. A stationary vane or nozzle 126 may be held in turbine assembly 110 by a radially outer platform 128 and a radially inner platform 130. Row 124 of blades in turbine assembly 110 includes rotating blades 132 coupled to rotor 112 and rotating with the rotor. Rotating blades 132 may include a radially inward platform 148 (at root of blade, FIG. 3) coupled to rotor 112 and, optionally, a radially outward tip shroud 136 (at tip of blade). As used herein, the term "component" may refer collectively to stationary nozzles 126, rotating blades 132 or any other structure in which metal coupons including porous region(s) according to the disclosure can be employed.

Figure 3:
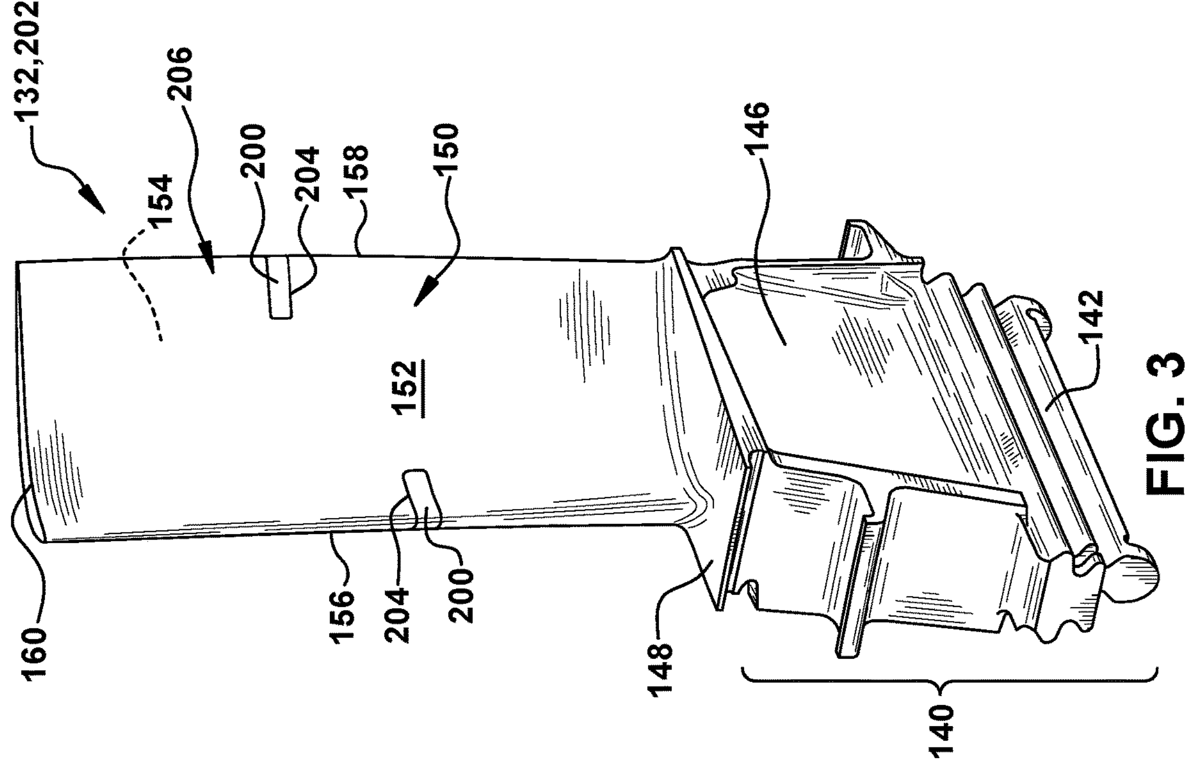
FIG. 3 shows a perspective view of a component in the form of a turbine rotating blade including a metal coupon according to embodiments of the disclosure.
Figure 4:
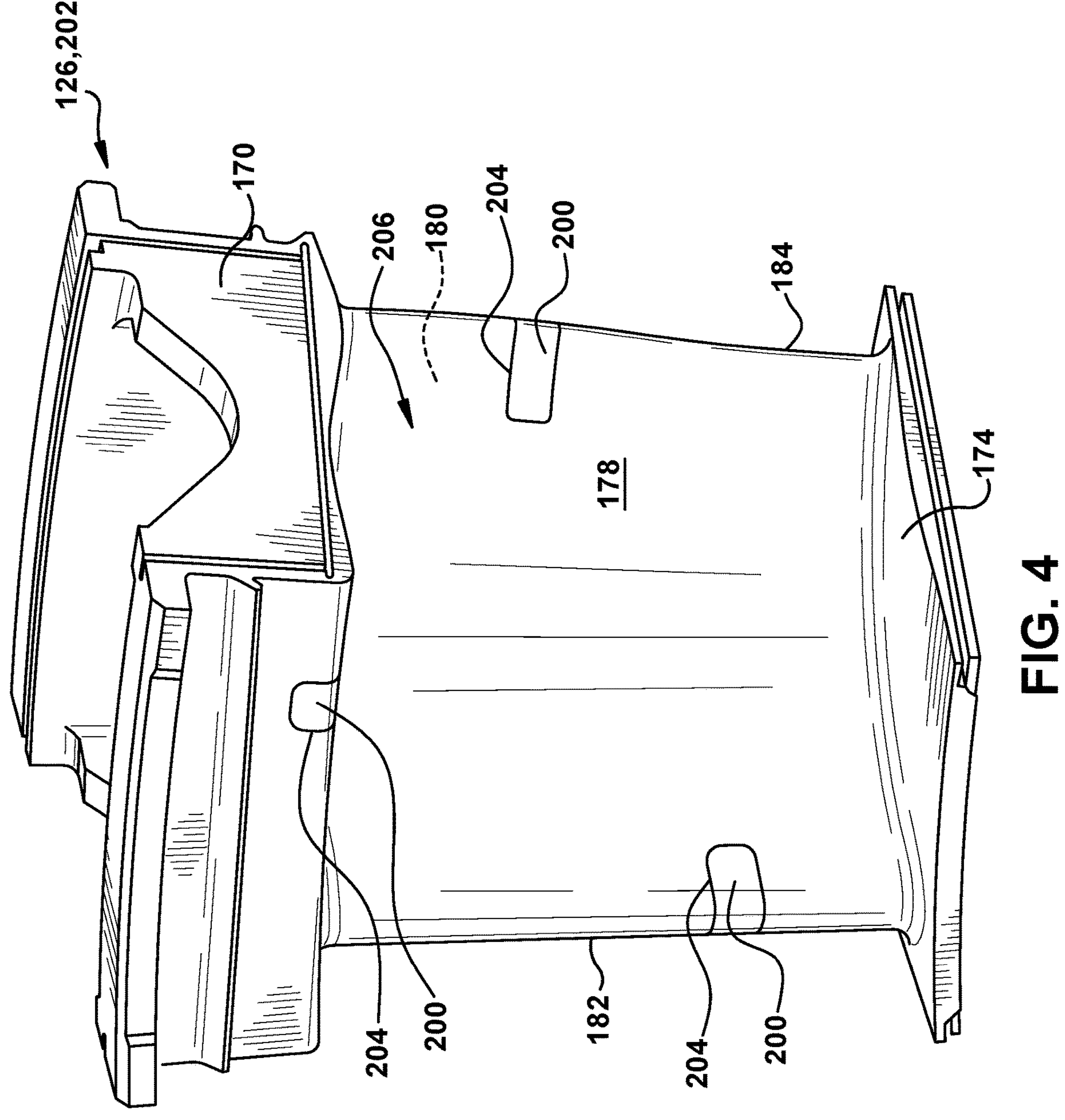
FIG. 4 shows a perspective view of a component in the form of a turbine nozzle including a metal coupon according to embodiments of the disclosure.

FIGS. 3 and 4 show illustrative components, such as hot gas path components of a turbomachine, in which teachings of the disclosure may be employed. FIG. 3 shows a perspective view of a turbine rotor blade 132 of the type in which embodiments of the present disclosure may be employed. Turbine rotor blade 132 includes a root 140 by which rotor blade 132 attaches to rotor 112 (FIG. 2). Root 140 may include a dovetail 142 configured for mounting in a corresponding dovetail slot in the perimeter of a rotor wheel 144 (FIG. 2) of rotor 112 (FIG. 2). Root 140 may further include a shank 146 that extends between dovetail 142 and a platform 148, which is disposed at the junction of an airfoil 150 and root 140 and defines a portion of the inboard boundary of the flow path through turbine assembly 110. It will be appreciated that airfoil 150 is the active component of rotor blade 132 that intercepts the flow of working fluid 151 (FIG. 2), i.e., hot combustions gases, and induces the rotor disc to rotate. It will be seen that airfoil 150 of rotor blade 132 includes a concave pressure side (PS) outer side wall 152 and a circumferentially or laterally opposite convex suction side (SS) outer wall 154 extending axially between opposite leading and trailing edges 156, 158 respectively. Side outer walls 152 and 154 also extend in the radial direction from platform 148 to an outboard tip 160, the latter of which may or may not include a tip shroud 136 (FIG. 2).

FIG. 4 shows a perspective view of a stationary nozzle 126 of the type in which embodiments of the present disclosure may be employed. Stationary nozzle 126 includes an outer platform 170 by which stationary nozzle 126 attaches to stationary casing 122 (FIG. 2) of the turbomachine. Outer platform 170 may include any now known or later developed mounting configuration for mounting in a corresponding mount in the casing. Stationary nozzle 126 may further include an inner platform 174 for positioning between adjacent turbine rotor blades 132 (FIG. 3) and platforms 148 (FIG. 3). Platforms 170, 174 define respective portions of the outboard and inboard boundary of the flow path through turbine assembly 110. It will be appreciated that airfoil 176 is the active component of stationary nozzle 126 that intercepts the flow of working fluid and directs it towards turbine rotor blades 132 (FIG. 3). It will be seen that airfoil 176 of stationary nozzle 126 includes a concave pressure side (PS) outer wall 178 and a circumferentially or laterally opposite convex suction side (SS) outer wall 180 extending axially between opposite leading and trailing edges 182, 184 respectively. Side outer walls 178 and 180 also extend in the radial direction from platform 170 to platform 174.

It is understood that blade 132 or nozzle 126 may include internal cooling structures including sources of coolant such as passages, conduits and other structure that deliver coolant to a surface thereof for film cooling. Coolant may include, for example, air from compressor 102.

Embodiments of the disclosure described herein may include aspects applicable to either stationary nozzle 126, turbine rotor blade 132 and/or any other industrial component that employs coupons. FIGS. 3 and 4 also show illustrative additively manufactured (AM) metal coupons 200 (hereafter "metal coupons 200" or "AM metal coupons(s) 200" for brevity) in a component 202. More particularly, metal coupons 200 may be in a coupon opening 204 in a body 206 of component 202. A "coupon opening 204 in body 206" may be any size void in body 206 up to an including a removed section of body 206, e.g., tip shroud. For example, metal coupons 200 can be in coupon openings 204 in trailing edges 158, 184 of blade 132 or nozzle 126, respectively. Alternatively, metal coupons 200 can be in coupon openings 204 in leading edges 156, 182 of blade 132 or nozzle 126, respectively. Metal coupon 200 could also be in any tip (not shown) of blade 132 or platform 170 (shown in FIG. 4), 174 of nozzle 126. It is emphasized, however, that metal coupons 200 can be employed in any coupon opening 204 in a body 206 of component 202. Body 206 can be any part of, or all, of component 202.

Figure 5:
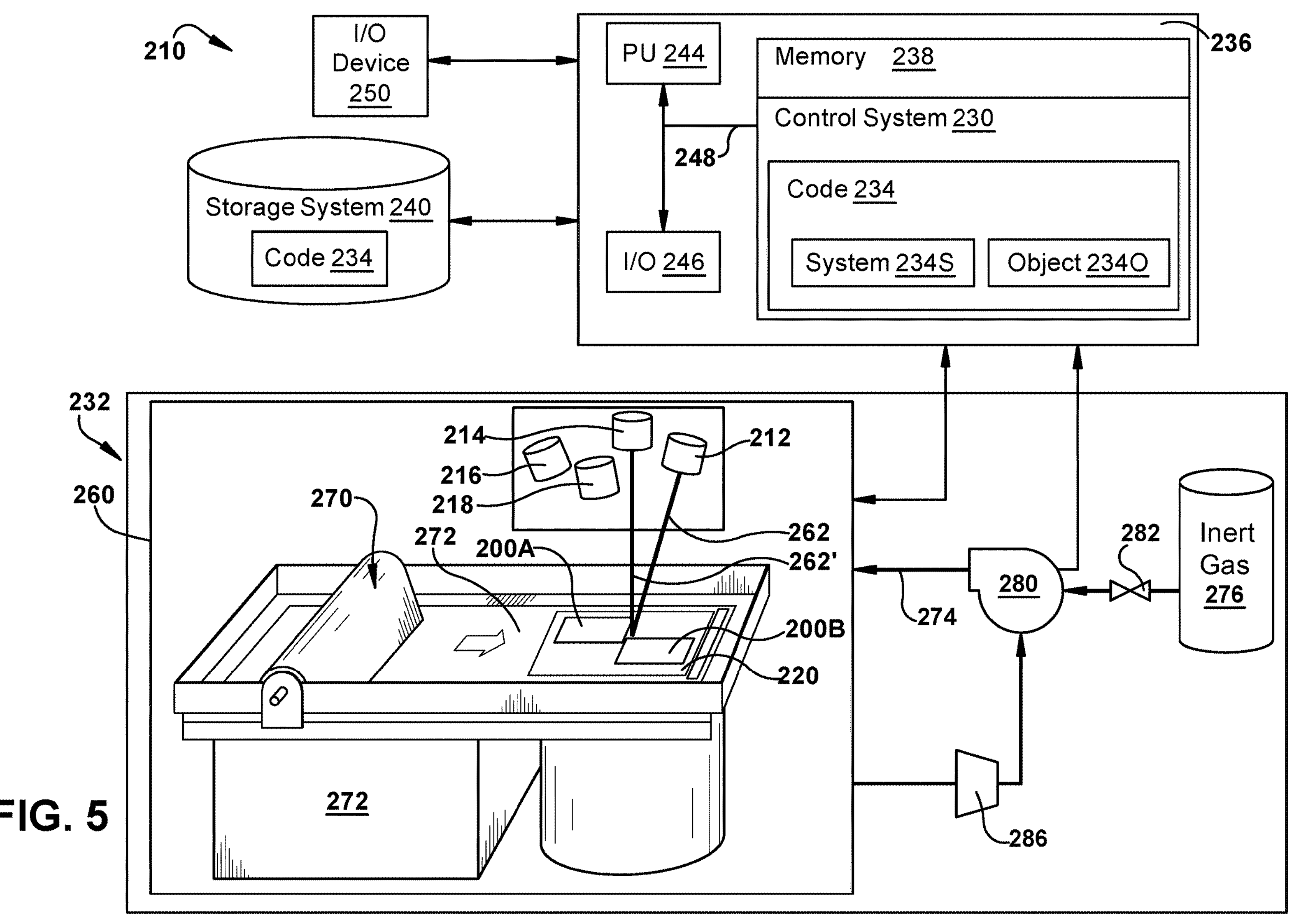
FIG. 5 shows a schematic block diagram of an illustrative additive manufacturing system for additively manufacturing a metal coupon according to embodiments of the disclosure.

Additively manufactured metal coupons 200 include a first section having a first porosity, and a stress-relief section having a second porosity and may be additively manufactured using any now known or later developed technique capable of forming porous metal region(s) (and denser regions). FIG. 5 shows a schematic/block view of an illustrative computerized metal powder additive manufacturing system 210 (hereinafter 'AM system 210') for generating metal coupon 200 or multiple metal coupons 200A, 200B, of which only a single layer is shown. The teachings of the disclosures will be described relative to building metal coupon 200 using multiple melting beam sources 212, 214, 216, 218, but it is emphasized and will be readily recognized that the teachings of the disclosure are equally applicable to build multiple coupons 200A, 200B using any number of melting beam sources. In this example, AM system 210 is arranged for direct metal laser melting (DMLM). It is understood that the general teachings of the disclosure are equally applicable to other forms of metal powder additive manufacturing such as but not limited to powder bed fusion, direct metal laser sintering (DMLS), electron beam melting (EBM), selective laser sintering (SLS), selective laser melting (SLM), and perhaps other forms of additive manufacturing (i.e., other than metal powder applications). Coupons 200A, 200B are illustrated as rectangular elements; however, it is understood that the additive manufacturing process can be readily adapted to manufacture any shaped coupon, a large variety of different coupons, and a large number of coupons on build platform 220.

AM system 210 generally includes an additive manufacturing control system 230 ("control system") and an AM printer 232. As will be described, control system 230 executes set of computer-executable instructions or code 234 to generate coupon(s) 200 using multiple melting beam sources 212, 214, 216, 218. In the example shown, four melting beam sources may include four lasers. However, the teachings of the disclosures are applicable to any melting beam source, e.g., an electron beam, laser, etc. Control system 230 is shown implemented on computer 236 as computer program code. To this extent, computer 236 is shown including a memory 238 and/or storage system 240, a processor unit (PU) 244, an input/output (I/O) interface 246, and a bus 248. Further, computer 236 is shown in communication with an external I/O device/resource 250. In general, processor unit (PU) 244 executes computer program code 234 that is stored in memory 238 and/or storage system 240. While executing computer program code 234, processor unit (PU) 244 can read and/or write data to/from memory 238, storage system 240, I/O device 250 and/or AM printer 232. Bus 248 provides a communication link between each of the components in computer 236, and I/O device 250 can comprise any device that enables a user to interact with computer 236 (e.g., keyboard, pointing device, display, etc.). Computer 236 is only representative of various possible combinations of hardware and software. For example, processor unit (PU) 244 may comprise a single processing unit or be distributed across one or more processing units in one or more locations, e.g., on a client and server. Similarly, memory 238 and/or storage system 240 may reside at one or more physical locations. Memory 238 and/or storage system 240 can comprise any combination of various types of non-transitory computer readable storage medium including magnetic media, optical media, random access memory (RAM), read only memory (ROM), etc. Computer 236 can comprise any type of computing device such as an industrial controller, a network server, a desktop computer, a laptop, a handheld device, etc.

As noted, AM system 210 and, in particular control system 230, executes code 234 to generate metal coupon(s) 200. Code 234 can include, among other things, a set of computer-executable instructions 234S (herein also referred to as 'code 234S') for operating AM printer 232, and a set of computer-executable instructions 234O (herein also referred to as 'code 234O') defining metal coupon(s) 200 to be physically generated by AM printer 232. As described herein, additive manufacturing processes begin with a non-transitory computer readable storage medium (e.g., memory 238, storage system 240, etc.) storing code 234. Set of computer-executable instructions 234S for operating AM printer 232 may include any now known or later developed software code capable of operating AM printer 232.

Set of computer-executable instructions 234O defining metal coupon(s) 200 may include a precisely defined 3D model of a coupon and can be generated from any of a large variety of well-known computer aided design (CAD) software systems such as AutoCAD®, TurboCAD®, DesignCAD 3D Max, etc. In this regard, code 234O can include any now known or later developed file format. Furthermore, code 234O representative of metal coupon(s) 200 may be translated between different formats. For example, code 234O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 234O representative of metal coupon(s) 200 may also be converted into a set of data signals and transmitted, received as a set of data signals and converted to code, stored, etc., as necessary. Code 234O may be configured according to embodiments of the disclosure to allow for formation of border and internal sections in overlapping field regions, as will be described. In any event, code 234O may be an input to AM system 210 and may come from a part designer, an intellectual property (IP) provider, a design company, the operator or owner of AM system 210, or from other sources. In any event, control system 230 executes code 234S and 234O, dividing metal coupon(s) 200 into a series of thin slices that assembles using AM printer 232 in successive layers of material.

AM printer 232 may include a processing chamber 260 that is sealed to provide a controlled atmosphere for metal coupon(s) 200 printing. A build platform 220, upon which metal coupon(s) 200 is/are built, is positioned within processing chamber 260. A number of melting beam sources 212, 214, 216, 218 are configured to melt layers of metal powder on build platform 220 to generate coupon(s) 200. While four melting beam sources 212, 214, 216, 218 are illustrated, it is emphasized that the teachings of the disclosure are applicable to a system employing any number of sources, e.g., 1, 2, 3, or 5 or more. As understood in the field, each melting beam source 212, 214, 216, 218 may have a field including a non-overlapping field region, respectively, in which it can exclusively melt metal powder, and may include at least one overlapping field region in which two or more sources can melt metal powder. In this regard, each melting beam source 212, 214, 216, 218 may generate a melting beam, respectively, that fuses particles for each slice, as defined by code 234O. For example, in FIG. 5, melting beam source 212 is shown creating a layer of metal coupon(s) 200 using melting beam 262 in one region, while melting beam source 214 is shown creating a layer of metal coupon(s) 200 using melting beam 262' in another region. Each melting beam source 212, 214, 216, 218 is calibrated in any now known or later developed manner. That is, each melting beam source 212, 214, 216, 218 has had its laser or electron beam's anticipated position relative to build platform 220 correlated with its actual position in order to provide an individual position correction (not shown) to ensure its individual accuracy. In one embodiment, each of plurality melting beam sources 212, 214, 216, 218 may create melting beams, e.g., 262, 262', having the same cross-sectional dimensions (e.g., shape and size in operation), power and scan speed.

Continuing with FIG. 5, an applicator (or recoater blade) 270 may create a thin layer of raw material 272 spread out as the blank canvas from which each successive slice of the final coupon will be created. Various parts of AM printer 232 may move to accommodate the addition of each new layer, e.g., a build platform 220 may lower and/or chamber 260 and/or applicator 270 may rise after each layer. The process may use different raw materials in the form of fine-grain metal powder, a stock of which may be held in a chamber 260 accessible by applicator 270. In the instant case, coupon(s) 200 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.). Other possibilities include, for example, René 108, CM 247 LC, Mar M 247 and any precipitation harden-able (PH) nickel alloy.

Processing chamber 260 is filled with an inert gas such as argon or nitrogen and controlled to minimize or eliminate oxygen. Control system 230 is configured to control a flow of a gas mixture 274 within processing chamber 260 from a source of inert gas 276. In this case, control system 230 may control a pump 280, and/or a flow valve system 282 for inert gas to control the content of gas mixture 274. Flow valve system 282 may include one or more computer controllable valves, flow sensors, temperature sensors, pressure sensors, etc., capable of precisely controlling flow of the particular gas. Pump 280 may be provided with or without valve system 282. Where pump 280 is omitted, inert gas may simply enter a conduit or manifold prior to introduction to processing chamber 260. Source of inert gas 276 may take the form of any conventional source for the material contained therein, e.g., a tank, reservoir or other source. Any sensors (not shown) required to measure gas mixture 274 may be provided. Gas mixture 274 may be filtered using a filter 286 in a conventional manner.

In operation, build platform 220 with metal powder thereon is provided within processing chamber 260, and control system 230 controls flow of gas mixture 274 within processing chamber 260 from source of inert gas 276. Control system 230 also controls AM printer 232, and in particular, applicator 270 and melting beam sources 212, 214, 216, 218 to sequentially melt layers of metal powder on build platform 220 to generate metal coupon(s) 200 according to embodiments of the disclosure.

While a particular AM system 210 has been described herein, it is emphasized that the teachings of the disclosure are not limited to any particular additive manufacturing system or method. Also, while the teachings of the disclosure relate to an additively manufactured metal coupon(s) 200, it will be recognized that component 202 may be manufactured in any now known or later developed manner such as additive manufacturing (perhaps similar to that described for metal coupon(s) 200), casting, or other methodology. Component 202 may include any of the material(s) listed herein for metal coupon(s) 200.

FIGS. 7A-L show views of an illustrative additively manufactured (AM) metal coupon 200 including an additively manufactured (AM) member 290, according to various embodiments of the disclosure. Metal coupon 200 and AM member 290 having a first section 292 and a stress-relief section 294. First section 292 has a first porosity, and stress-relief section 294 has a second porosity. More particularly, stress-relief section 294 has a porous region 300 having the second porosity (with pores 302). Stress-relief section 294 may have a second porosity, for example, between 2% to 50% open space volume to total volume of the stress-relief section 294. Stress-relief section 294, i.e., porous region 300, has at least one of thermal conductivity, ductility, tensile strength or fatigue strength less than that of first section 292. The first porosity of first section 292 is significantly denser than stress-relief section 294, e.g., it can have few if any pores 302 and can be solid. First section 292 includes a high-stress zone 296 (dashed circle). High-stress zone 296 may be any cross-sectional area or volume having a residual stress therein that a user wants to reduce or relieve stress from. High-stress zone 296 has localized stress and/or stress concentrations higher than stress-relief section 292, and may have at least one of thermal conductivity, ductility, tensile strength or fatigue strength different than stress-relief section 292. High-stress zone 296 may be identified in any now known or later developed manner such as but not limited to: through observation of previously made metal coupons 200 and stress modeling.

"Porosity," as used herein, is a ratio of open space volume to total volume of the stated structure, e.g., porous region, metal coupon, etc. Typically, in this regard, porosity is stated as a percentage of volume of open space to overall or total volume of the stated structure. The open space is empty areas in a solid material and may be referred to herein as "pores" 302 and may include interconnecting passages in the material of the stated structure. A "porous region" 300 in metal coupon 200 is thus less than 100% solid and includes open spaces in the form of pores 302 and/or interconnecting passages. As noted, porous metal coupons 200 may include first section 292, but also includes one or more stress-relief sections 294 with porous regions 300 that are less than 100% solid. As used herein, a three-dimensional boundary of a porous region (or sub-region or stress-relief sub-section) for purpose of identifying a "total volume" thereof can be identified by where a change in porosity of greater than 2% relative to an adjacent region or sub-region occurs within metal coupon 200 and/or an edge of metal coupon 200 exists. "Open space volume" is collectively a three-dimensional space that is empty, i.e., a void, gap, empty space and/or not filled with material, within a region or sub-region. As used herein, "different porosities" or "differences in porosity," generally means any variety of characteristics such as: percentage of open space volume to total volume, a number of pores 302 in a given volume, the volume (i.e., size) of pores 302, shape of pores 302, and variations in connecting passages between pores 302 that may not be recognized as actual discrete pores (referred to herein as "pore connecting passages"). As one non-limiting example only, pore size can be in a range of, for example, $1.07\times10^{-6}$ to $8.58\times10^{-3}$ cubic millimeters ($6.54\times10^{-11}$ to $5.24\times10^{-7}$ cubic inches), or as another non-limiting example, the pore diameter can be in a range of 0.0127 millimeters (mm) to 0.254 mm (0.0005 inches to 0.01 inches). In the drawings, the different porous regions or sub-regions are typically shown as being continuous or in contact with one another, it is emphasized however that they can be isolated from one another in any manner, e.g., with solid areas therebetween. That is, a single metal coupon may include one or more isolated, non-contacting porous regions. Note, the terms "region" and/or "sub-region" may be used interchangeably to denote changes in porosity.

With differences in, for example, pore shape or pore connecting passages, it will be recognized that differences in porosity may not be exclusively based on percentage of open space volume to total volume. However, where differences in porosities are compared in terms of degree, e.g., higher or lower, the difference referenced is exclusively that of the volume characteristics, i.e., percentage of open space volume to total volume.

Porous metal coupon(s) 200 can be formed with stress-relief section 294 with porous region 300, and perhaps multiple porous regions 300 with different porosities, using AM system 210 as described herein, or any other metal additive manufacturing system or method capable of forming porous metals. Porous regions 300 can also be referred to herein as stress-relief sub-sections. In terms of AM system 210 operation, melting beam sources 212, 214, 216, 218 can be programmed to intermittently not sinter metal, leaving metal powder rather than solid material. This process may include overlapping laser field regions by different amounts and/or designing pores 302 into a build file, i.e., code 234O. Less overlap of each laser scan creates more porosity, and more laser overlap between successive scans creates less porosity. Laser spot size, scanning speed, focus and/or power can also be controlled to adjust porosity. More particularly, the additively manufacturing includes using AM system 210 having one or more melting beam sources 212, 214, 216, 218 to fuse together the layers of the metal powder and adjusting a parameter of the system to control the porosity of the at least two porous regions. The adjusting a parameter may include at least one of: adjusting an amount of overlap of a melting area of the one or more melting beam 262, 262' (FIG. 5) (from sources 212, 214, 216, 218); adjusting system scanning speed; or adjusting at least one of melting beam spot size, focus, or power. When the un-melted metal powder is removed from metal coupon(s) 200, it leaves pores 302 with interconnecting passages between pores 302 and creating one or more porous region(s) in metal coupon 200. In any event, the layered manufacture of metal coupon 200 can be controlled to create the desired porosity for any number, shape and/or size of stress-relief sections 294 and/or porous regions 300 within any desired layer(s) of metal coupon(s) 200.

Figures 6A, 6B:
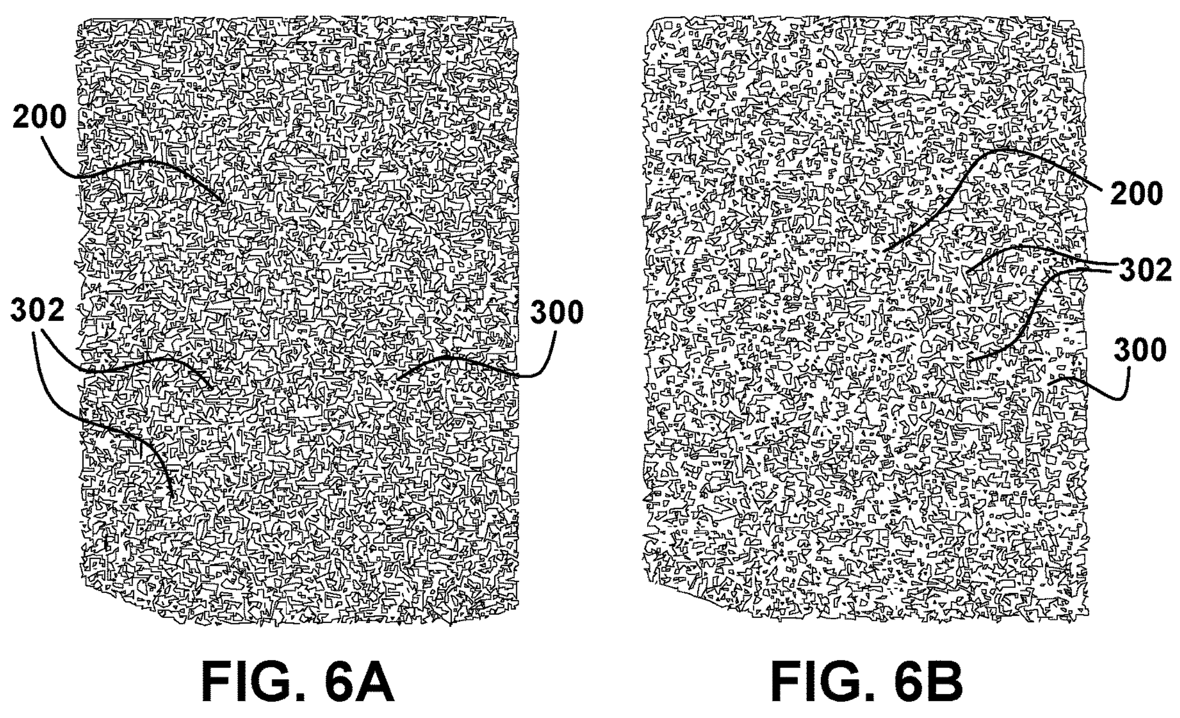
FIGS. 6A-D show top-down views of sample metal coupons having porous regions having different porosities according to embodiments of the disclosure.
Figures 6C, 6D:
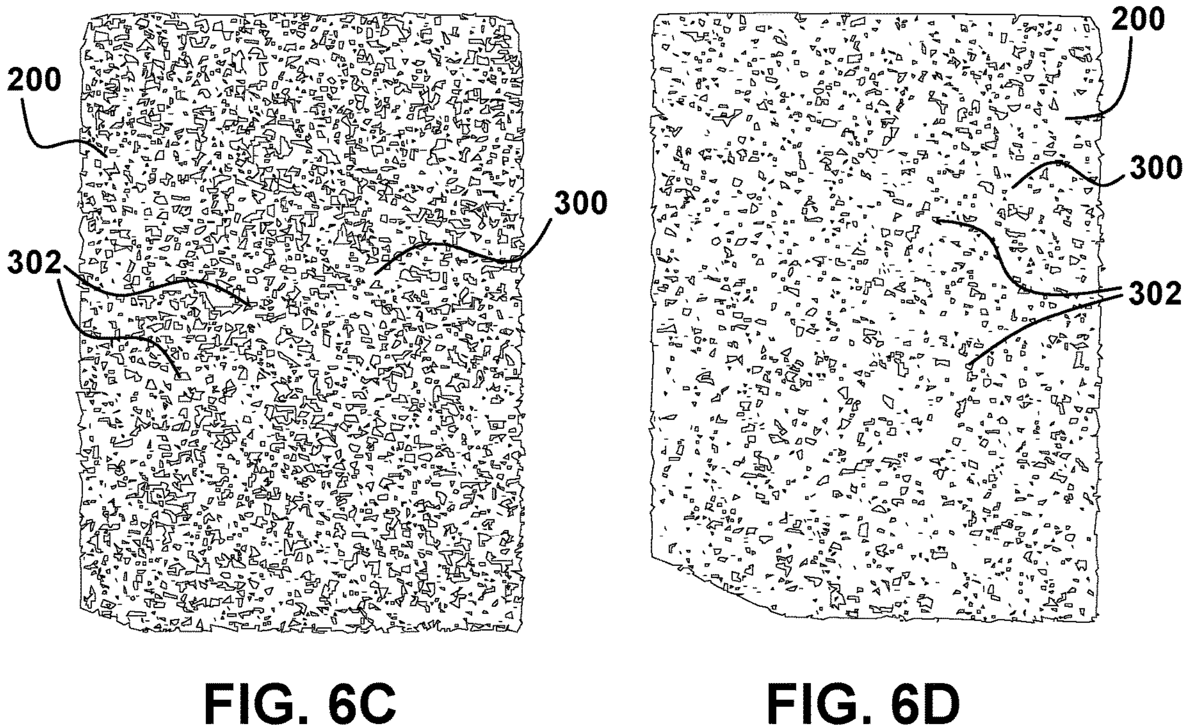

FIGS. 6A-D show top-down schematic views of non-limiting sample metal coupons 200 having different porosities. Pores 302 are shown as darker open spaces in the drawings. FIG. 6A shows a sample metal coupon 200 having a first porosity of approximately 40% open space volume to total volume of the sample (with a generally high amount of open space and more or larger pores 302), FIG. 6B shows a sample metal coupon 200 having a first porosity of approximately 30% open space volume to total volume of sample, FIG. 6C shows a sample metal coupon 200 having a first porosity of approximately 20% open space volume to total volume of the sample, FIG. 6D shows a sample metal coupon 200 having a first porosity of approximately 10% open space volume to total volume of the sample (with a generally low amount of open space). Each porous region may have a porosity between 2% to 50% open space volume to total volume of the porous region, i.e., 2% to 50% open space with the other 50% to 98% solid. In other embodiments, each porosity may be between 10% to 40% open space volume to total volume of porous region 300, i.e., 10% to 40% open space with the other 60% to 90% solid. In other embodiments, porous region(s) can be provided in metal coupons 200 having a porosity in a range of less than 10%, in a range of less than 15%, in a range of less than 20%, in a range of less than 25%, in a range of less than 30%, in a range of less than 35%, in a range of less than 40%, in a range of less than 45%, in a range of 2% to 45%, in a range of 2% to 40%, in a range of 2% to 35%, in a range of 2% to 30%, in a range of 2% to 25%, in a range of 2% to 20%, in a range of 5% to 45%, in a range of 5% to 40%, in a range of 5% to 35%, in a range of 5% to 30%, in a range of 5% to 25%, in a range of 5% to 20%, in a range of 10% to 45%, in a range of 10% to 40%, in a range of 10% to 35%, in a range of 10% to 30%, in a range of 10% to 25%, in a range of 10% to 20%, in a range of 15% to 45%, in a range of 15% to 40%, in a range of 15% to 35%, in a range of 15% to 30%, in a range of 15% to 25%, in a range of 15% to 20%, in a range of 10% to 50%, in a range of 20% to 50%, in a range of 25% to 50%, in a range of 30% to 50%, in a range of 35% to 50%, or in a range of 40% to 50%. As will be described herein, other ranges of porosity are also possible.

Figures 7A, 7B:
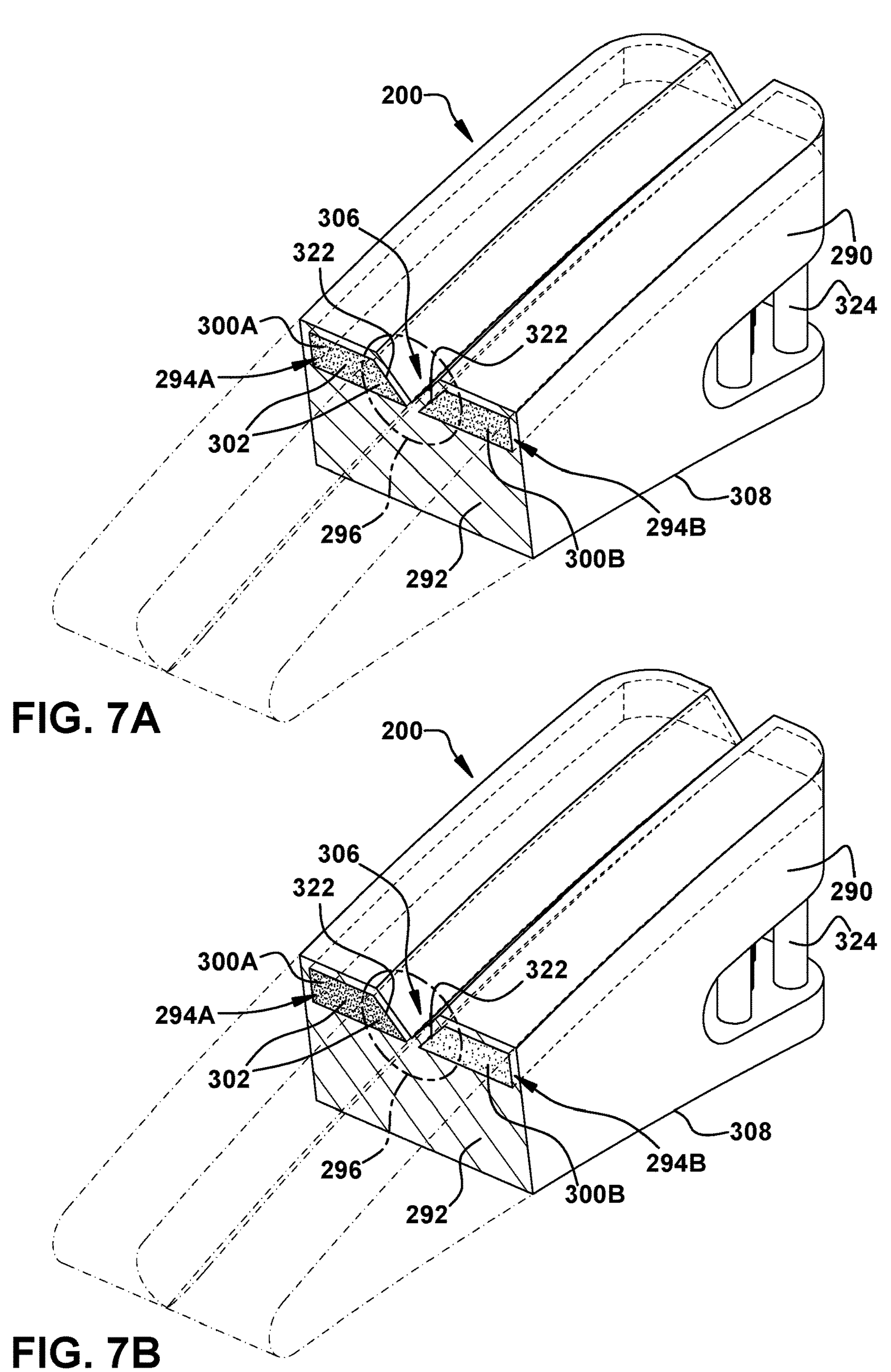
FIGS. 7A-L show perspective views of a metal coupon according to various embodiments of the disclosure.
Figures 7C, 7D:
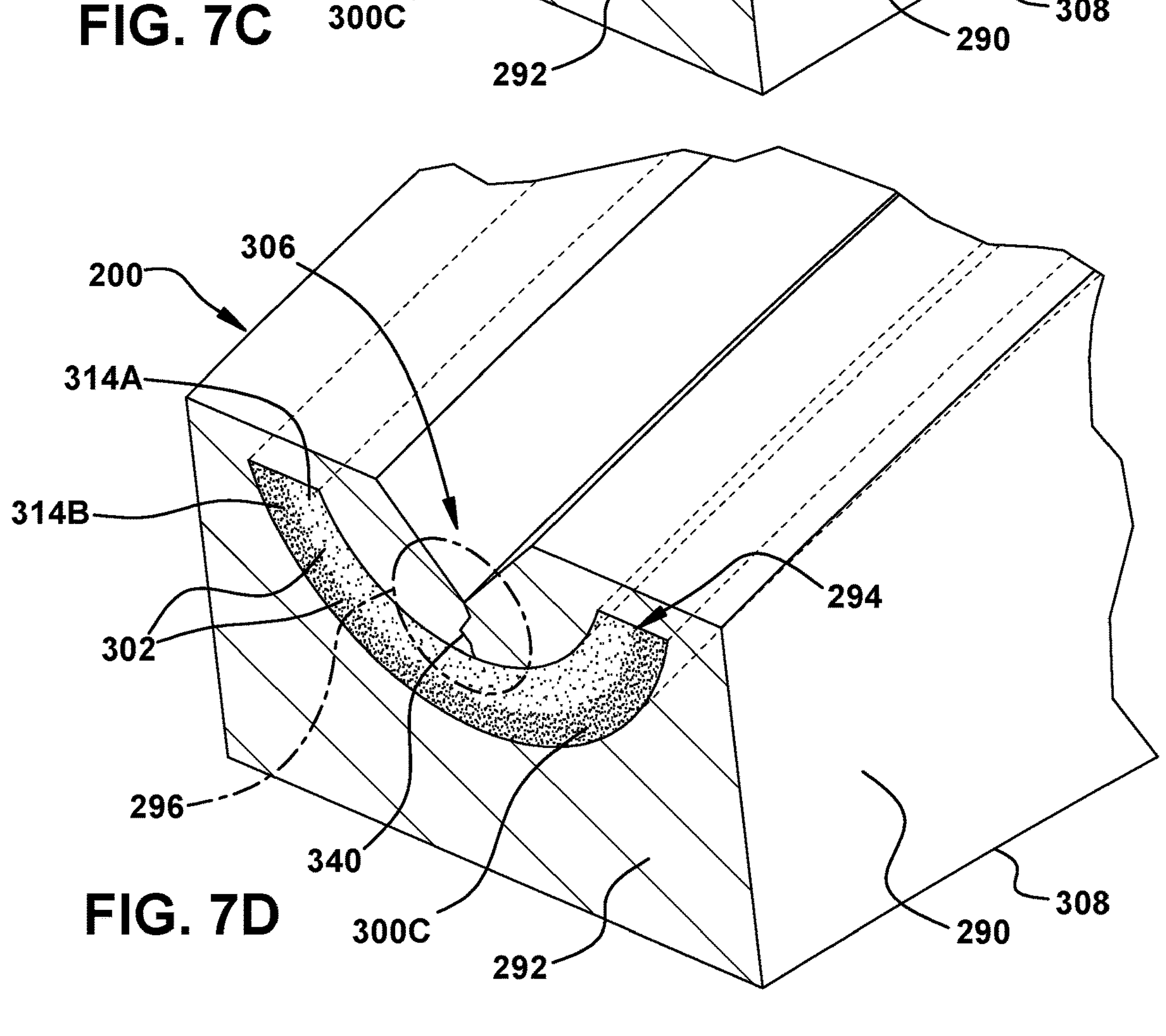
Figures 7E, 7F:
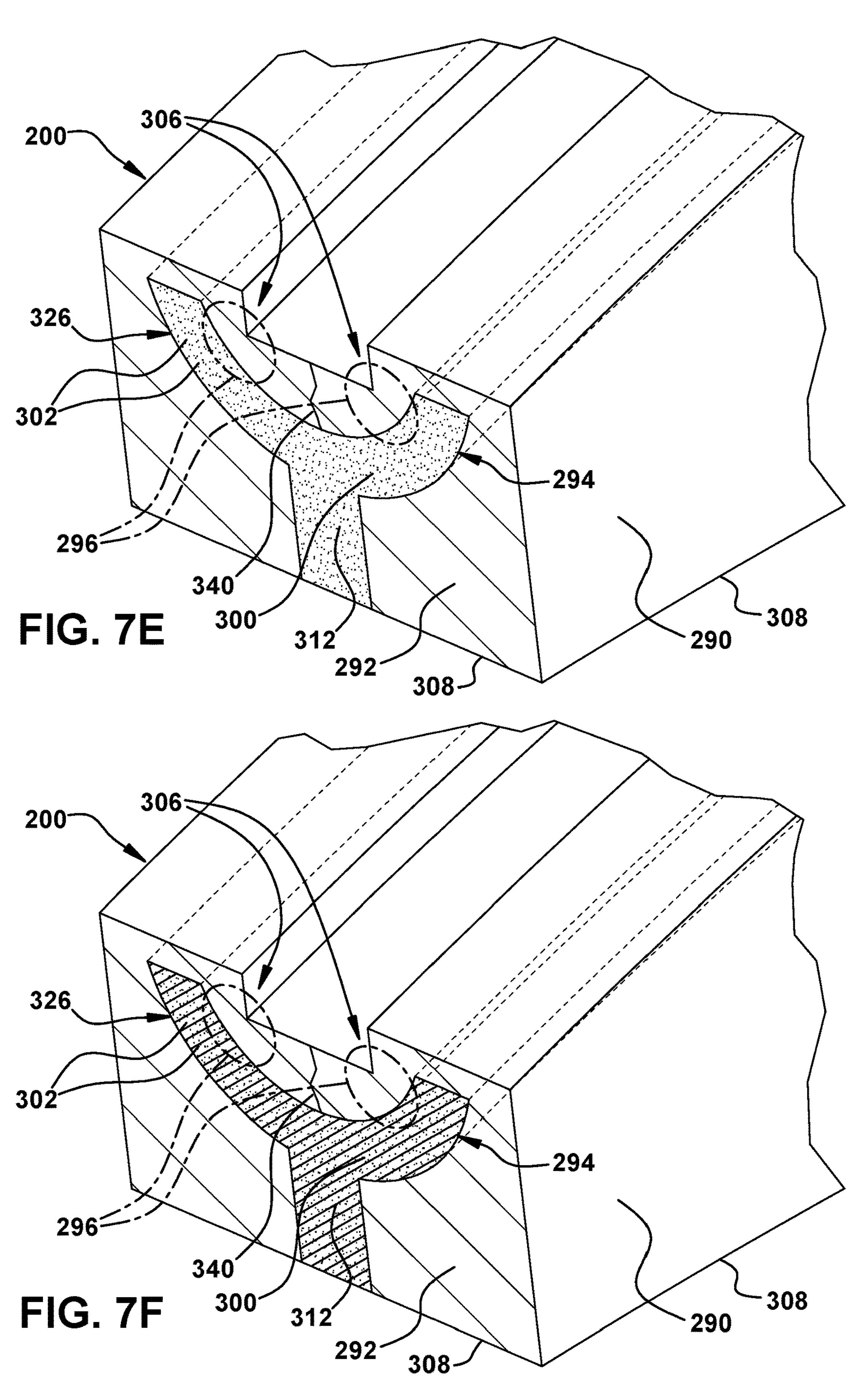

As shown FIGS. 7A-L, metal coupon 200 may have stress-relief section 294 including porous region(s) 300 (or sub-sections). In any version, areas within layers of metal coupon 200 that define stress-relief section 294 with porous region(s) 300 can be formed to include pores 302, and areas within layer of metal coupon 200 that define first section 292 are formed with few if any pores 302, i.e., they're very dense or solid. Porous region(s) 300 may have a uniform porosity or a variable porosity. In the non-limiting example shown in FIGS. 7A-F, high-stress zone 296 is in a sharp corner 306 in first section 292; however, high-stress zone 296 can be located anywhere in first section 292. FIGS. 7A-B shows metal coupon 200, i.e., AM metal member 290, with stress-relief section 294 with two porous regions 300A, B (stress-relief sub-sections); FIGS. 7C-D shows metal coupon 200 with a single stress-relief section 294; and FIGS. 7E-F show metal coupon 200 with a single stress-relief section 294 including a sub-section 312 that extends to an exterior surface 308 of metal coupon 200. FIG. 7F shows the FIG. 7E embodiment with a braze material 310 in stress-relief section 294. Metal coupon 200 in FIGS. 7A-F are shown having a shape configured to be positioned in, as shown in FIGS. 3 and 4, coupon opening 204 in trailing edge 158 or 184 of blade 132 or nozzle 126, respectively, or coupon opening 204 in leading edge 156 or 182 of blade 132 or nozzle 126, respectively. Metal coupon 200 could also be in any tip (not shown) of blade 132 or platform 170 (shown), 174 of nozzle 126. It is emphasized, however, that metal coupons 200 can be employed in any coupon opening 204 in any part of body 206 of any component 202.

With regard to porosity, FIGS. 7A-B shows porous regions 300A-B with a uniform porosity. Where more than one porous region 300 is used, e.g., as in FIGS. 7A-B, porous regions 300A-B may have different porosities from each other (and first section 292). FIG. 7A show porous regions 300A-B having the same porosity, and FIG. 7B shows porous regions 300A-B having different porosities from each other (and first section 292). That is, first porous region 300A has a different porosity than second porous region 300B. As noted herein, the two porous regions 300A, 300B can include pores 302 that are, e.g., of different size or number, to create the different porosities. Consequently, first sub-section 294A and second sub-section 294B may have at least one of thermal conductivity, tensile strength, ductility, or fatigue strength less than first section 292 and different than each other.

FIGS. 7C-D show metal coupon 200 with porous region 300C with a variable porosity region. In the example shown in FIGS. 7C-D, an upper sub-region 314A of porous region 300C is less dense than a lower sub-region 314B; however, the variation in porosity can be arranged in any desired manner, e.g., to relieve stress. Here, areas within layers of metal coupon 200 that define variably porous region 300C can be formed to include pores 302, e.g., of different size or number, to create the different porosities. The variable porosity region 300C may have any porosity that changes, e.g., increases, decreases and/or both increases and decreases. The change in porosity may be gradual, or stepped or otherwise incremental. Each porous region 300 may have a porosity as previously described herein.

Figures 7G, 7H:
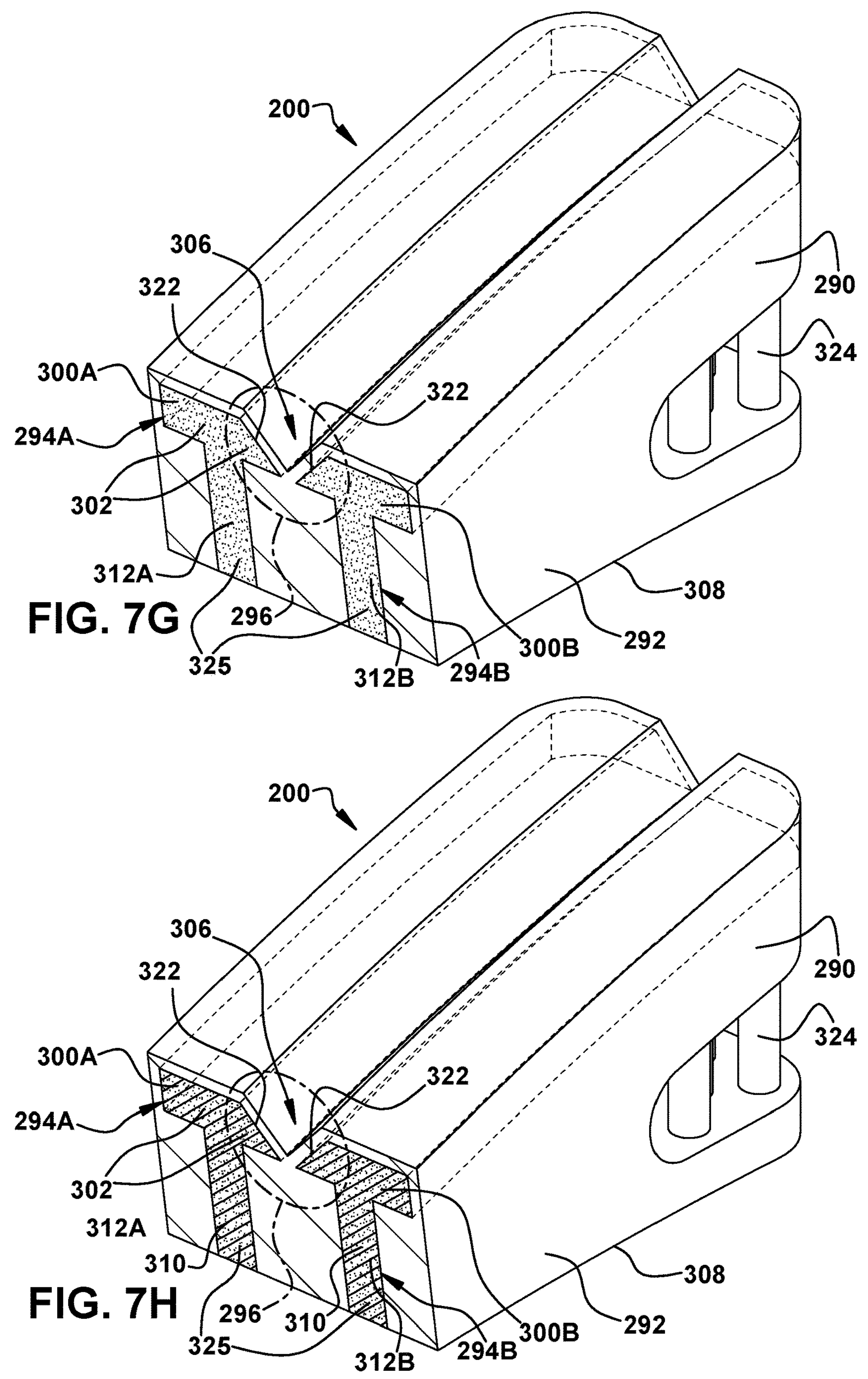
Figures 7I, 7J:
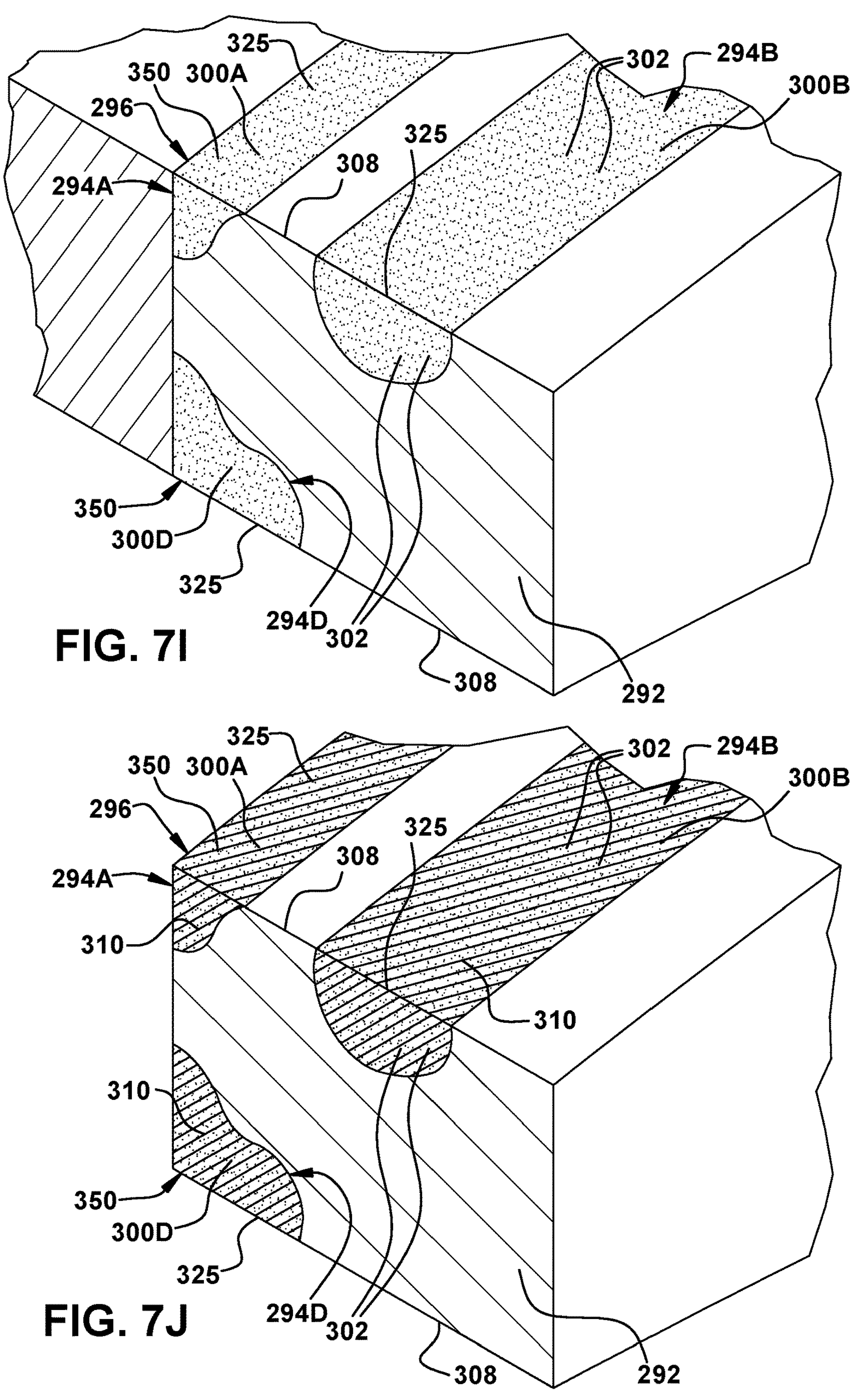

Stress-relief section 294 can have any shape and/or dimensions configured to relieve stress of a high-stress zone 296 in metal coupon 200 and, perhaps, in coupon opening 204 (FIGS. 3-4) in body 206 (FIGS. 3-4). In FIGS. 7A-B, the stress-relief section includes a first sub-section 294A having a first porous region 300A and a second sub-section 294B having a second porous region 300B. Each of first and second porous regions 300A, 300B have a porosity between 2% to 50% open space volume to total volume of the respective porous region, but also may have any porosity described herein. In FIGS. 7A-B, stress-relief sub-sections 294A, 294B include two generally rectangular shapes with angled ends 322 configured to match corner 306 to relief stress. Stress-relief sub-sections 294A-B in FIGS. 7A-B are entirely embedded in AM metal member 290/metal coupon 200, i.e., first section 292. In FIGS. 7C-D, stress-relief section 294 has a U-shape or cup-shape that surrounds corner 306. In FIGS. 7E-F, stress-relief section 294 has a U-shaped or cup-shaped upper sub-section 326 and a (more linear) sub-section 312 that extends to exterior surface 308 of metal coupon 200. That is, porous region 300 of stress-relief section 294 includes first sub-section 326 within first section 292 and second sub-section 312 extending to exterior surface 308 of metal coupon 200. Collectively, in the example shown, sub-sections 312, 326 of stress-relief section 294 in FIGS. 7E-F have a generally Y-shape. However, other shapes are possible. In FIGS. 7G-H, stress-relief sub-sections 294A, 294B include two generally rectangular shapes with angled ends 322 configured to match corner 306 to relief stress (similar to FIGS. 7A-B) and sub-sections 312A, 312B (similar to FIGS. 7E-F) that extend to exterior surface 308 of metal coupon 200. In FIG. 7I-J, stress-relief sections 294 have various oblong shapes that may include an exterior surface 325 contiguous (coplanar in examples shown) with exterior surface 308 of metal coupon 200. Porous region(s) 300 (sub-sections) of stress-relief sections 294 can have any shape desired configured to relief stress of a high-stress zone 296.

Referring to FIG. 7A-D, porous region(s) 300 of stress-relief section 294 is/are fully embedded within first section 292. That is, stress-relief section 294 is entirely within AM metal member/metal coupon, i.e., it does not extend to exterior surface 308 of metal coupon 200. However, this is not necessary in all cases. For example, as shown in FIGS. 7E-J, porous region(s) 300 (sub-section(s)) of stress-relief section 294 may extend to exterior surface 308 of metal coupon 200. In FIGS. 7E-H, sub-section(s) 312 may have dimensions smaller than sub-section 326 of stress-relief section 294. In one example, as will be further described herein, sub-section(s) 312 may take the form of a porous conduit through which braze material 310 may pass through capillary action, i.e., from an exterior of metal coupon 200. In FIGS. 7I-J, as noted, porous region(s) 300A-B, and 300D may have exterior surface 325 contiguous (coplanar in example shown) with exterior surface 308 of metal coupon 200. As will be recognized, a wide variety of alternative arrangements in which part of porous region(s) 300 extend to exterior surface 308 of metal coupon 200 are possible to address stress relief and/or, as will be described further herein, control braze material flow and physical characteristics of component 202 once metal coupon 200 is coupled thereto.

In FIGS. 7A-7E, 7G and 7I, porous region(s) 300 of stress-relief section(s) 294 remain as additively manufactured, i.e., they remain porous material. In other embodiments, however, a braze material 310 used to couple metal coupon 200 to component 202 may infiltrate into stress-relief section 294 and porous region(s) 300, e.g., as will be described further, during a brazing process used to couple the coupon to the component. In FIGS. 7F, 7H and 7J, a braze material 310 infiltrates into stress-reliefs section 294, i.e., porous region(s) 300 thereof. A crack 340 is also shown in the FIGS. 7C-D and 7E-F embodiments. As illustrated in FIGS. 7C and 7E, stress-relief section 294 acts as a crack stop, preventing crack 340 from propagating further through metal coupon 200. More particularly, metal coupon 200 is shown including a crack 340 in first section 292, e.g., vertically above porous region 300 (could be in other locations). Crack 340 may be caused by residual stresses in high-stress zone 296 from metal coupon 200 manufacture, or other causes such as thermal differences occurring when metal coupon 200 is coupled to component 202 (e.g., during welding or brazing). Crack 340, however, stops at stress-relief section 294, i.e., porous region 300 thereof, because the stress is not present in stress-relief section 294. Hence, stress-relief section 294 acts as a crack stop, preventing further propagation of crack 340 in first section 292. As shown, for example, in FIG. 7F, braze material 310 may infiltrate crack 340 in FIG. 7E during a brazing process, i.e., it fills crack 340 preventing further propagation thereof in first section 292 and further stabilizing crack 340. In FIGS. 7F and 7H, braze material 310 may infiltrate into stress-relief section 294, i.e., porous region(s) 300 thereof, through sub-section(s) 312 that extends to exterior surface 308 of metal coupon 200. In FIG. 7J, braze material 310 infiltrates into stress-relief section 294, i.e., porous region(s) 300, through exposed exterior surface 325 thereof.

Figures 7K, 7L:
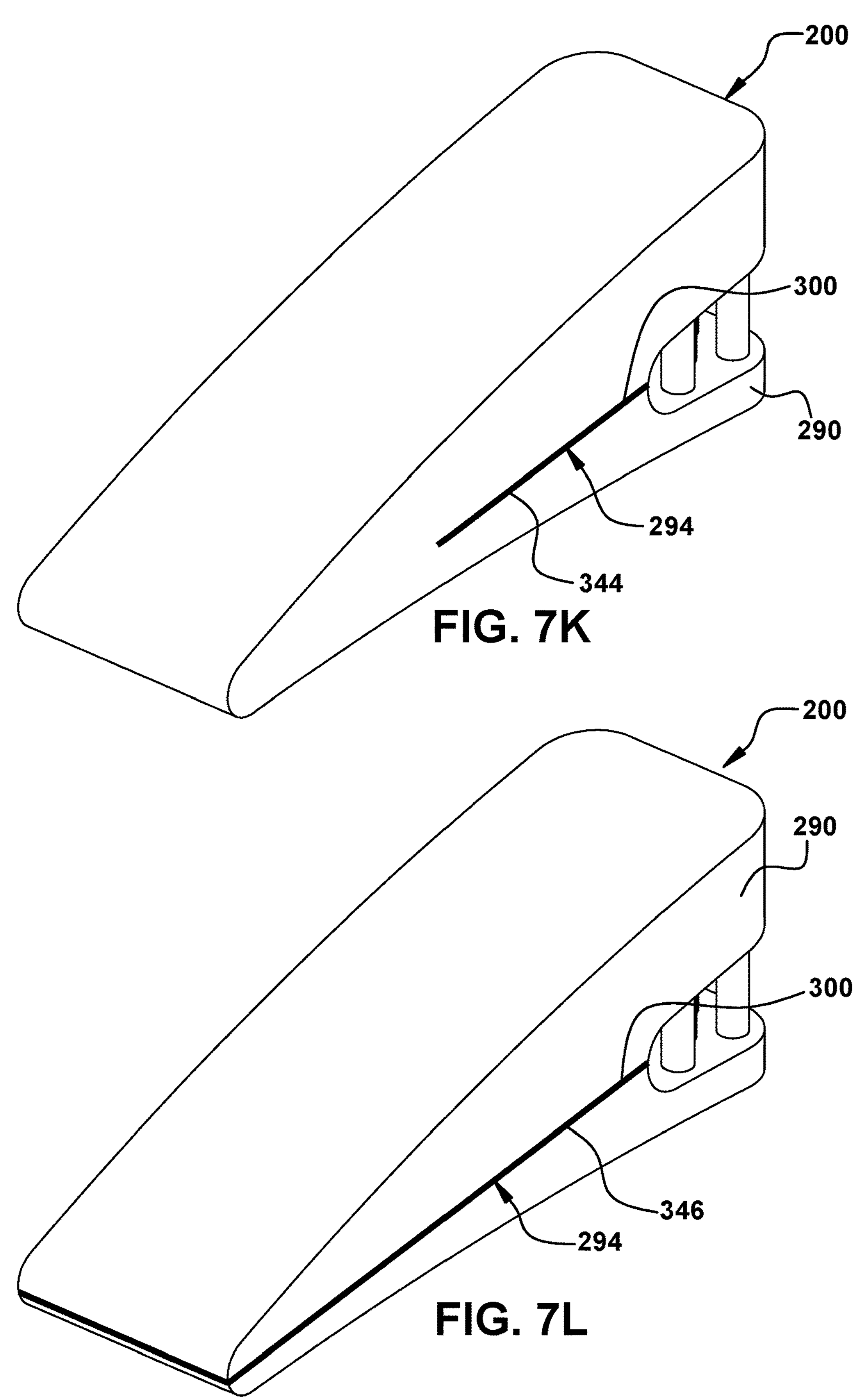

In FIGS. 7A-J, stress-relief section 294, i.e., porous region 300, extends at least partially across layers of AM metal member 290—over more than one layer as formed by AM system 210 (FIG. 5). However, porous region 300 of stress-relief section 294 can be in a single layer 344 of metal coupon 200. Further, porous region 300 of stress-relief section 294 can be in a portion of single layer 344 of metal coupon 200. FIGS. 7K-L show a perspective view and a side view, respectively, of metal coupons 200 with stress-relief sections 294, i.e., with porous region 300, in a single layer 344. Single layer 344 can be in any layer of metal coupon 200, i.e., AM metal member 290. Stress-relief section 294 or single layer 244 can be distal from build platform 220. As shown in FIG. 7K, porous region 300 of stress-relief section 294 can also be in only a portion of single layer 344 of metal coupon 200. That is, porous region 300 does not extend across an entire layer of metal coupon 200. Rather, single layer 344 (or multi-layer stress-relief section 294) of AM metal member 290 extends only partially across AM metal member 290. FIG. 7L shows porous region 300 of stress-relief section 294 can also be across an entirety of a single layer 346 of metal coupon 200.

Referring to FIGS. 3, 4, 5, 7A-L and 8A-F, embodiments of a method according to the disclosure will now be described. The methods may include forming metal coupon 200 for repairing component 202 and/or repairing a component 202. FIGS. 8A-F show perspective views of the method according to embodiments of the disclosure.

With regard to forming metal coupon 200, FIGS. 5, 7A, 7C, 7E, 7I and 7K-L show the method according to embodiments of the disclosure. In the embodiment, the method may include additively manufacturing metal coupon 200 with AM system 210 (or other AM system 210 capable of forming porous region(s) 300 (and solid first section)) by successively depositing and fusing together layers of a metal powder (i.e., raw material 272). As noted, metal coupon 200 includes first section 292 and stress-relief section 294. First section 292 has a first porosity, and stress-relief section 294 has a second porosity. Stress-relief section 294 (including porous region 300) has the second porosity between 2% to 50% open space volume to total volume of the stress-relief section 294. Stress-relief section 294 has at least one of thermal conductivity, tensile strength, ductility, or fatigue strength less than first section 292. The method may also include identifying a high-stress zone 296 (see, e.g., FIGS. 7A-F) in metal coupon 200. As noted, high-stress zone 296 has a higher stress compared to other regions of the metal coupon 200. High-stress zone(s) 296 may be identified in any now known or later developed manner such as but not limited to: through observation of previously made metal coupons 200 and stress modeling of metal coupon 200 alone and/or within component 202. The additive manufacturing may include forming stress-relief section 294 in or adjacent to high-stress zone 296 in metal coupon 200 to relieve the stress.

The additive manufacturing may include any AM process described herein to manufacture porous metal coupon 200 (and dense or solid regions). The additive manufacturing includes using one or more melting beams 212, 214, 216, 218 (FIG. 5) to fuse together the layers of the metal powder (raw material 272), and further comprises adjusting an amount of overlap of a melting area of the one or more melting beams 212, 214, 216, 218 (FIG. 5), among other things described herein, to control the porosity of porous region(s) 300. The additive manufacturing may include selectively forming porous region(s) 300 among first section 292 of metal coupon 200 by controlling AM printer 232. The additive manufacturing may include manufacturing metal coupon 200 to generally match profile (e.g., shape, dimension, etc.) of coupon opening 204, or to have a near net shape of coupon opening 204 based on the model of coupon opening 204. As used herein, "near net shape" indicates metal coupon 200 is within desired manufacturing tolerances with no or minimal additional processing, e.g., machining, at the specified stage of the manufacturing process. Some additional texturing or polishing to an exterior surface may be desired. It is recognized that additional coatings may be applied once metal coupon 200 is in a component 202. When formed to a near net shape, metal coupon 200 may also have a shape after manufacture that, when positioned in coupon opening 204, is very close to surface(s) of body 206 required to couple metal coupon 200 in coupon opening 204, e.g., with selected braze material(s) and no or minimal required finishing methods, like machining or grinding. The use of porous region(s) 300 in exterior surface 308 of metal coupon 200, however, accommodates greater joint gap dimensional variance compared to solid coupons with narrow gaps for braze material because the porous regions provide improved braze material grasp and hold despite the larger gaps. While metal coupon 200 is shown additively manufactured based on the FIG. 7I-J embodiments in FIGS. 8B-C, it may take any form described herein.

As described herein, a second porosity of stress-relief section 294 (i.e., porous region(s) 300 or sub-sections) in metal coupon 200 is controlled and/or customized, to, among other things, relieve stress. In addition, where stress-relief section 294 extends to exterior surface 308 of metal coupon 200, i.e., AM member 290, a porosity thereof in metal coupon 200 is controlled, i.e., customized, to control flow of braze material 310 therein during a subsequent brazing process that couples metal coupon(s) 200 into, as shown in FIGS. 3, 4 and 9A-C, coupon opening 204 in body 206 of component 202. In any event, each porous region or sub-section 300 may be customized in terms of any of the afore-described characteristics that impact porosity. A size, shape and/or location of porous regions 300 can be arranged to relieve stress. Further, where stress-relief section 294 (porous region(s) 300) extends to exterior surface 308 of metal coupon 200, i.e., AM member 290, a size, shape and/or location of porous region(s) 300 can be arranged to direct braze material as desired. For example, in FIG. 7H, metal coupon 200 includes sub-sections 312 to direct braze material 310, through capillary action, into sub-sections 326 of stress-relief section 294. In contrast, in FIG. 7J, metal coupon 200 includes porous region(s) or sub-section 300A near an edge 350 of metal coupon 200 (and/or component 202) where it would couple with coupon opening 204 (FIGS. 3-4) and may include a different porous region or sub-section 300B with a different porosity in a different area, e.g., distal from edge 350. In this manner, braze material 310 would be distributed in different manners in each porous region or sub-section 300A-B, resulting in different physical characteristic(s) of metal coupon 200 and/or component 202 in different regions thereof. More particularly, any number of porous regions or sub-sections 300 can be used to customize (create) at least one physical characteristic in component 202 that includes metal coupon 200, such as: joint adhesive bond strength, coupon strength, stress (and strain) relief and/or resistance, wear resistance, oxidation resistance, cycle fatigue, thermal conductivity, tensile strength, ductility, fatigue strength, electrical conductivity, surface roughness, hardness, and mass. In a non-comprehensive list of possibilities, metal coupon 200 may include a higher porosity in one region or sub-section 300 to direct more braze material 310 therein through capillary action compared to other first sections 292 of metal coupon 200 to control at least one physical characteristic of component 202. In another embodiment, metal coupon 200 may include a lower porosity in one region or sub-section 300 to direct less braze material therein through capillary action compared to other solid regions of metal coupon 200 to control at least one physical characteristic of component 202. Any arrangement of stress-relief sections 294 and porous regions or sub-sections 300 thereof is possible to create the desired stress relief and braze material flow and infiltration to attain desired physical characteristics.

The additive manufacturing may form any of the embodiments described herein relative to FIGS. 7A-L. For example, as shown in FIGS. 7K-L stress-relief section 294 may be within a single layer 344 (FIGS. 7K, 7L) or 346 (FIG. 7L) of metal coupon 200.

Figures 8A, 8B, 8C, 8D:
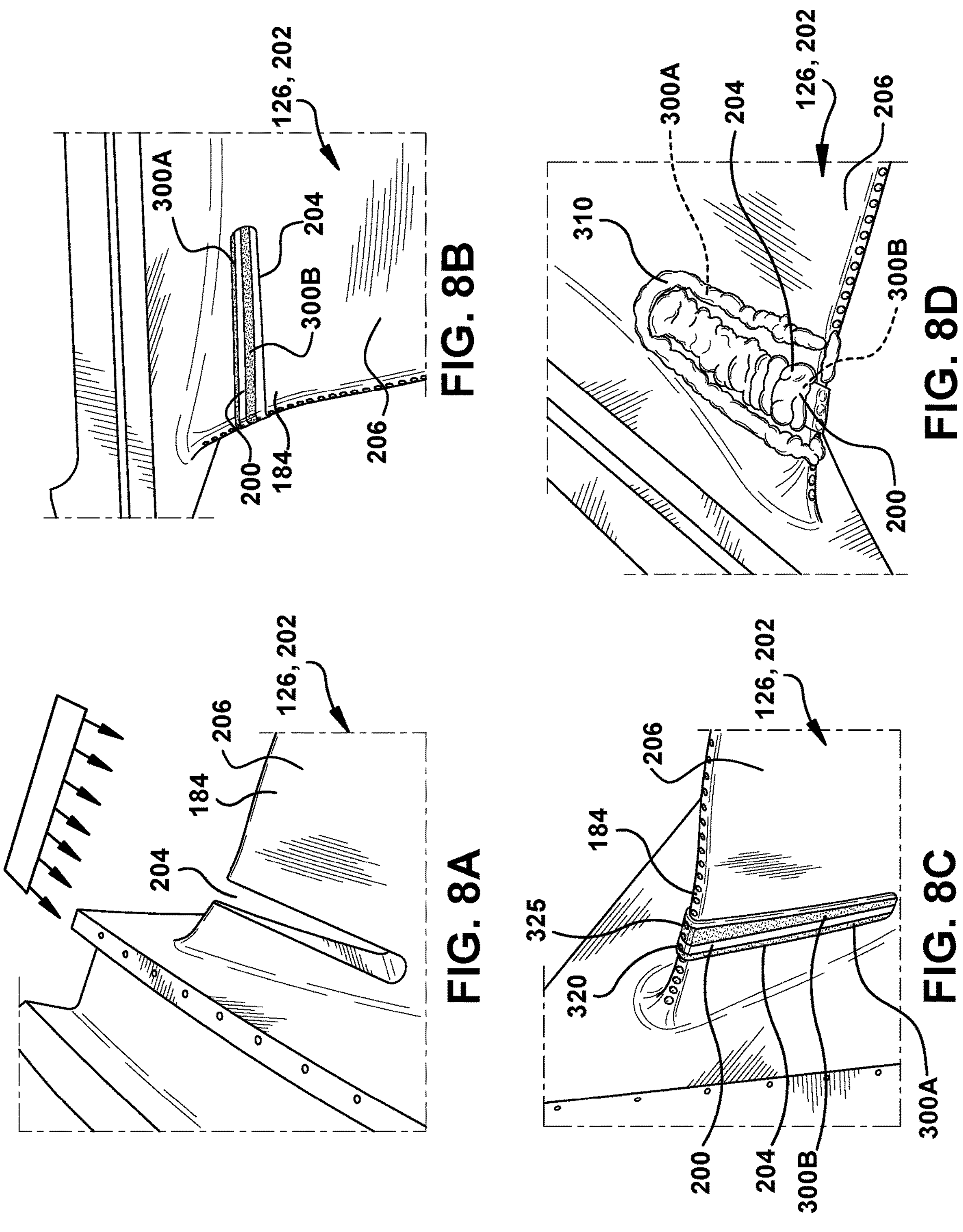
FIGS. 8A-F show perspective views of methods according to various embodiments of the disclosure.

In certain embodiments, the additive manufacturing may also include forming any variety of improvements for component 202 in metal coupon 200 including, for example, structures not previously present in component 202. Component 202 may be an original component in need of improvements or a component including a removed or damaged part. For example, as shown in FIG. 8C, the additive manufacture may optionally include forming a cooling passage 320 in metal coupon 200. Cooling passage 320 may extend in metal coupon 200 in any manner, e.g., in a serpentine path therein or extending through an exterior surface 325 of metal coupon 200. In another example, as shown in FIG. 7A-D, the additive manufacture may optionally include forming one or more support and/or cooling structures 324 (e.g., pin/fins) (perhaps with cooling passages (not shown) therein) in metal coupon 200. Any advantageous internal structural changes can be made in metal coupon(s) 200. Any now known or later developed post-additive manufacture finishing processing may be optionally performed on metal coupon(s) 200, e.g., abrading to smooth surfaces thereof. Advantageously, however, teachings of the disclosure may remove the need for certain finishing processes of metal coupon 200 in component 202, such as but not limited to: peening, heat treatment, and hot isostatic pressing (HIP).

With regard to repairing a component 202 using metal coupon 200, FIGS. 5, 7A-L and 8A-8F show the method according to embodiments of the disclosure. FIG. 8A shows creating coupon opening 204 in body 206 of component 202. Coupon opening 204 is configured to receive metal coupon 200. Coupon opening 204 may have any shape desired. In certain applications, coupon opening 204 is created by removing a damaged part of body 206 of component 202, but coupon opening 204 can also be in an original version of component 202, e.g., at a location that is challenging to manufacture with the rest of component 202. In the non-limiting example shown, coupon opening 204 is in a trailing edge 184 of a nozzle 126. FIG. 8A also shows creating a model of coupon opening 204. The model creating may include using any now known or later developed three-dimensional scanner (not shown, see arrows) to scan and create a digitized representation of coupon opening 204 relative to body 206 of component 202. As the process of scanning and modeling a part is well known in the art, further details are omitted so the reader can focus on the salient aspects of the disclosure.

As noted, FIGS. 5, 7A, 7C, 7E, 7G, 7I and 7K-L show additively manufacturing metal coupon 200 according to embodiments of the disclosure.

FIGS. 8B and 8C show positioning metal coupon 200 in coupon opening 204 in body 206 of component 202. Metal coupon 200 may be positioned in coupon opening 204 in body 206 in any now known or later developed manner, e.g., using robotic arms or manually. Where necessary, metal coupon 200 may be held in place in any desired manner, e.g., adhesive, clamps, nickel-chromium tack welds, ball tacks, resistance weld, fusion tack weld, etc.

Figure 8F:
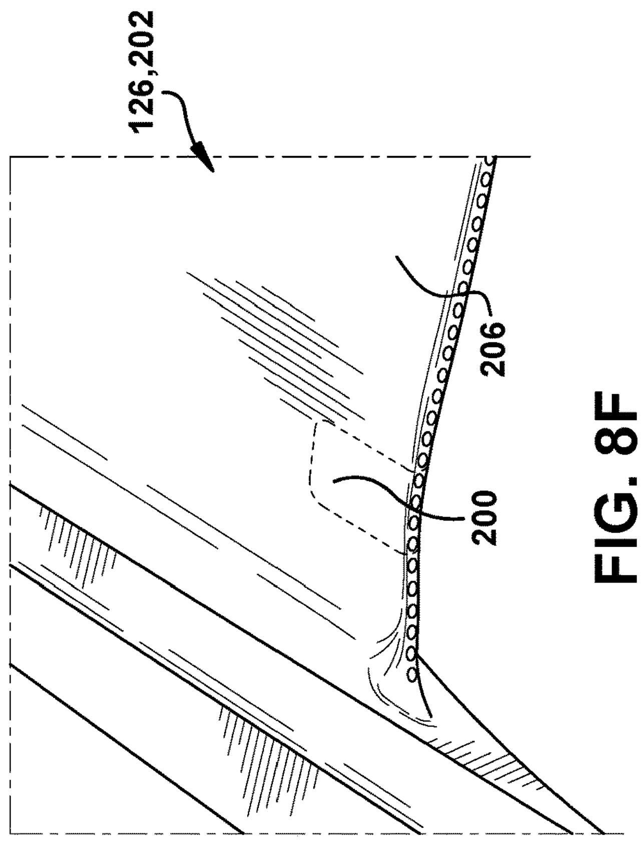
Figure 8E:
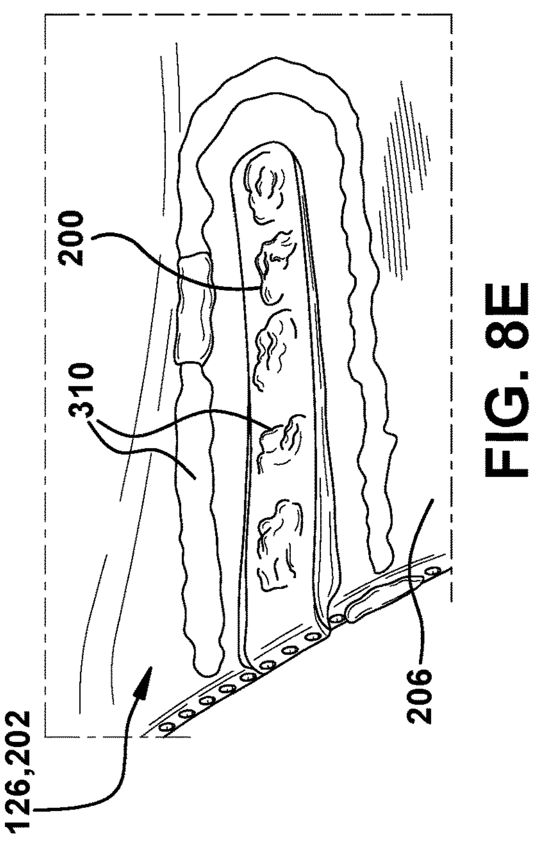

FIG. 8D-E shows infiltrating metal coupon 200 with a braze material 310 to couple the metal coupon to coupon opening 204 in body 206, i.e., performing a brazing process. The infiltrating step also causes braze material 310 to infiltrate stress-relief section 294 where porous region(s) or sub-section(s) 300 thereof is located at exterior surface 308 of metal coupon 200. For example, stress-relief section 294 may include first sub-section 326 within first section 292 and second sub-section 312 extending to exterior surface 308 of metal coupon 200. Here, as shown in FIGS. 7F, 7H and 7J, braze material 310 infiltrates into first and second sub-sections 326, 312 of stress-relief section 294. As shown in FIG. 7F, where first section 292 includes crack 340 that stops at stress-relief section 294, braze material 310 infiltrates into crack 340 to prevent further propagation thereof and stabilize the crack.

Braze material 310 may include any now known or later developed brazing composition, such as but not limited to: GE (Alstom) B1P, Amdry™ D15, DF4B, or BRB, some the formulations of which are listed with other braze material formulations in the following table:

| Alloy | Ni | Cr | Co | B | Al | Ta | Y |
|---|---|---|---|---|---|---|---|
| Amdry ™ D15 | 65.10 | 15.30 | 10.30 | 2.30 | 3.50 | 3.50 | 0.00 |
| Amdry ™ BRB | 70.50 | 14.00 | 9.00 | 2.50 | 4.00 | 0.00 | 0.00 |
| Amdry ™ DF4B | 67.15 | 14.00 | 10.00 | 2.75 | 3.50 | 2.50 | 0.10 |

The infiltrating may include any now known or later developed brazing process such as using a vacuum brazing system, induction brazing system, and/or inert gas atmosphere heating system and related techniques. In one non-limiting example, the brazing may include, for example, applying the braze material (FIG. 8D) and applying heat (FIG. 8E) to cause it to flow into, through and around metal coupon 200 through capillary action.

The infiltrating injects braze material 310 into, among other areas, any stress-relief section 294 on exterior surface 308 of metal coupon 200. Where porous regions or sub-sections 300 of stress-relief section 294 are at exterior surface 308 of metal coupon 200, porous regions or sub-sections 300 may also control the infiltration based at least on a characteristic of the porosity thereof. As shown in FIGS. 7I-J, the different porosities of porous regions or sub-sections 300A-B and 300D and perhaps any variable porosity region or sub-section 300C (FIGS. 7C-D) therein, result in different braze material 310 flow and infiltration. As a result of the brazing process, porous regions or sub-sections 300A, 300B with braze material 310 therein have at least one different physical characteristic. For example, more braze material 310 may result in a stronger joint adhesive bond strength, higher ductility, higher thermal or electrical conductivity or higher oxidation resistance, and less braze material 310 may result in less surface roughness, less hardness, lower joint adhesive bond strength, lower ductility, lower thermal or electrical conductivity or lower oxidation resistance. In any event, controlling the amount of braze material and the porosity of any different porous regions or sub-section 300 at exterior surface 308 of metal coupon 200 allows controlling physical characteristics of the final product. Depending on the braze material 310 used, among other factors, the different porosities allow for customization of at least one physical characteristic of component 202, such as: joint adhesive bond strength, stress (strain) relief and/or resistance, wear resistance, oxidation resistance, thermal conductivity, electrical conductivity, surface roughness, hardness, and/or mass. In addition, the multi-flow paths for braze material 310 using porous regions 300 may decrease the likelihood of a lack of fill and/or voids along a brazed joint compared to the conventional narrow gap-filling brazing process, and due to tight manufacturing tolerances required for narrow gap brazing. Hence, component 202 may be at least 98% solid despite the use of metal coupon 200 with stress-relief sections 294 and porous region(s) 300 therein.

In certain embodiments, different braze materials 310 may be used in different parts of metal coupon(s) 200, providing further customization of the coupling of metal coupon(s) 200 in component 202 and physical characteristics of regions of component 202. For example, referring to FIG. 9C, a first braze material 310A may be used on a first part or side 327 of component 202 and another braze material 310B, different than first braze material 310A, may be used on the same side 327, and another braze material 310C, different than both braze materials 310, 310B, may be used on another part or side 328 of component 202. In one example, referring to FIGS. 3, 4 and 9C, first part or side 327 of component 202 may be a first (concave, pressure) side outer walls 152, 178 of airfoil 150, 176 and second or side 328 of component 202 may be a second (convex, suction) side outer walls 154, 180 of airfoil 150, 176. The different braze materials 310A, 310B, in addition to different porous regions 300, on the different part or sides 327, 328 can be customized for the anticipated environment of component 202 at those locations. As will be recognized, the variations of braze materials and/or porous regions possible to address different situations are immense.

FIG. 8F shows illustrative optional finishing steps for component 202, such as but not limited to machining to smooth exterior surfaces and remove excess braze material. As noted, the teachings of the disclosure may remove the need for other finishing steps typically used to address residual stresses present in the material post additive manufacturing, e.g., peening, heat treatment, hot isostatic pressing (HIP), among others.

Other embodiments of a method according to the disclosure may include just forming metal coupon 200 for repairing component 202. In this case, as shown in FIG. 8A, the method includes creating a model of coupon opening 204 in body 206 of component 202, and additively manufacturing metal coupon 200 to at least closely fit coupon opening 204, e.g., with a near net shape of coupon opening 204. Metal coupon 200 can take any form described herein relative to FIGS. 7A-L.

Figure 9A:
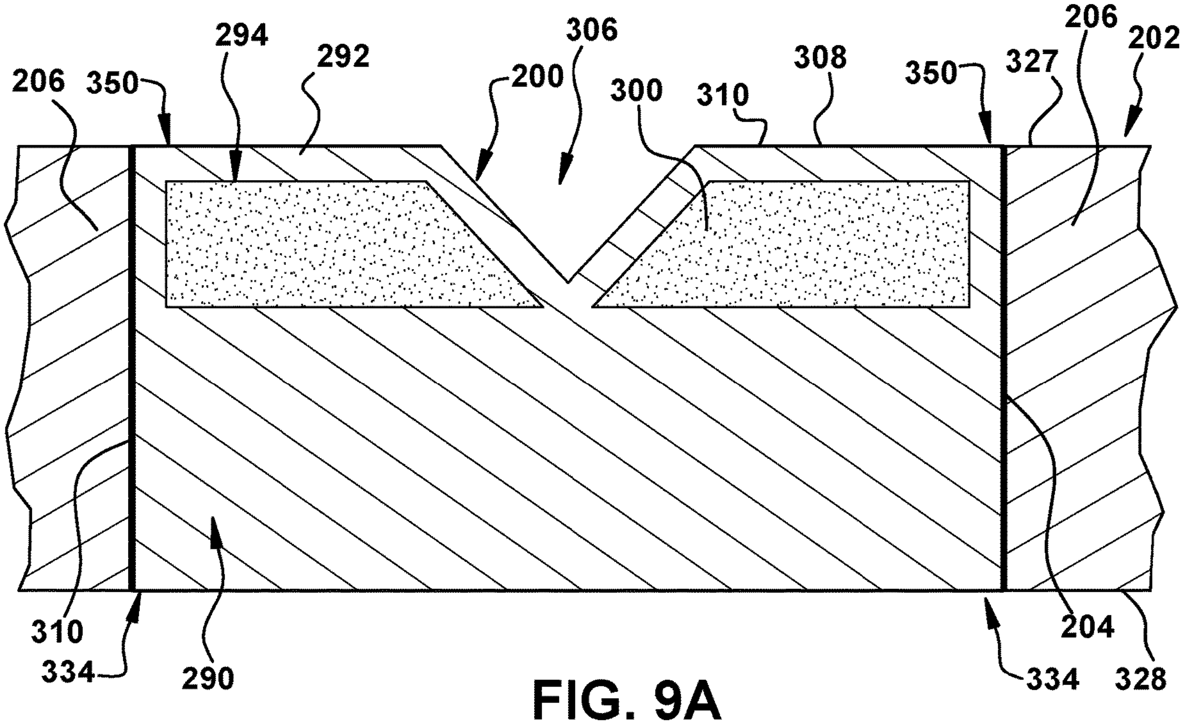
FIGS. 9A-C show enlarged cross-sectional views of a metal coupon to a coupon opening in a body of a component according to embodiments of the disclosure.
Figure 9B:
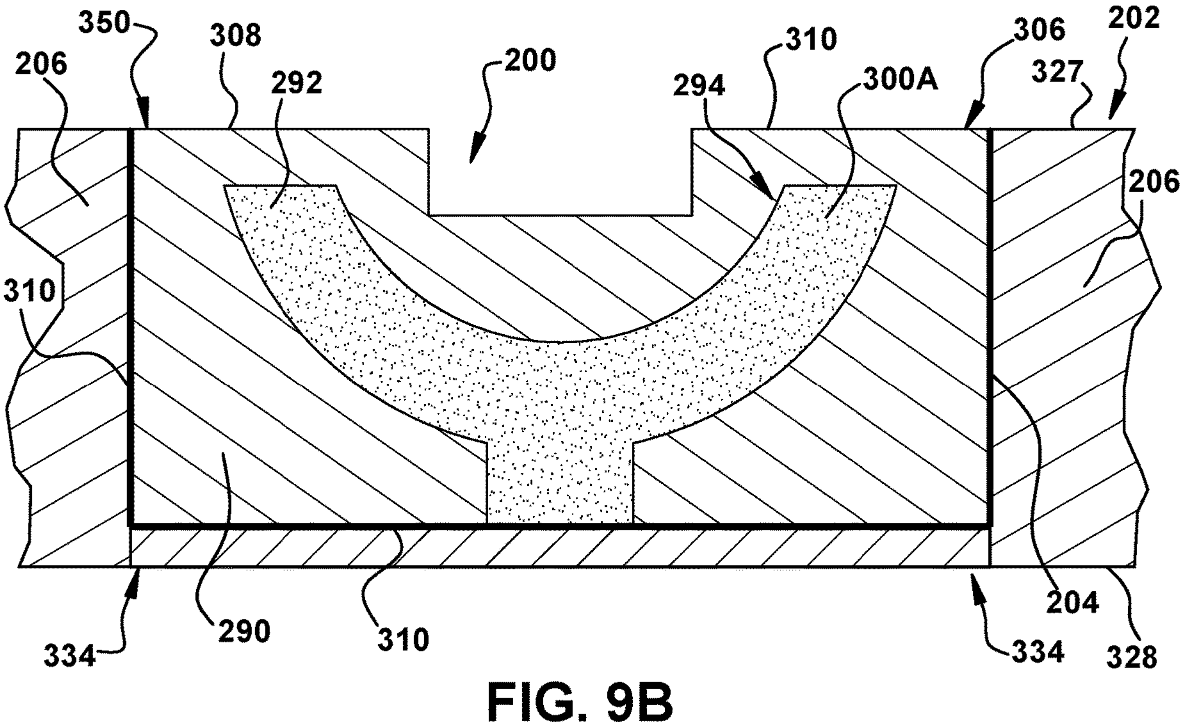
Figure 9C:
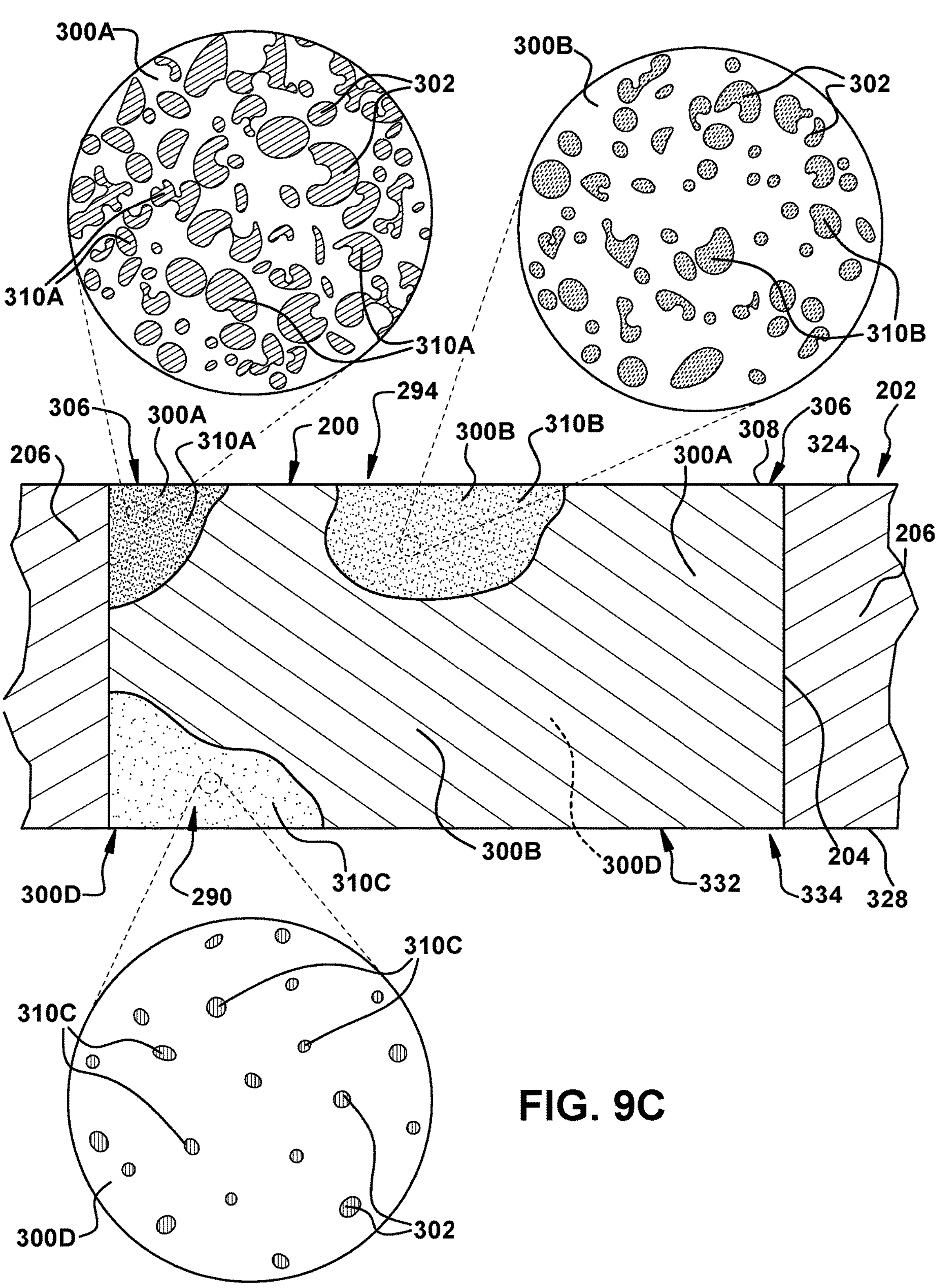

FIGS. 3, 4 and 9A-C show embodiments of component 202 according to embodiments of the disclosure. FIGS. 9A-C show enlarged cross-sectional views of metal coupon 200 on coupon opening 204 of body 206 of component 202. FIG. 9A shows component 202 with metal coupon 200 of FIG. 7A, FIG. 9B shows component 202 with metal coupon 200 of FIG. 7E, and FIG. 9C shows component 202 with metal coupon 200 of FIG. 7I-J. In FIG. 9B, coupon 200 is in a U-shaped coupon opening 204 in body 206 of component 202. As noted, component 202 includes body 206. Body 206 can have any form for the particular industrial application in which component 202 is used. In the examples used herein, body 206 may include a turbine rotating blade 132 (FIG. 3) or a turbine stationary nozzle 126 (FIG. 4). While metal coupon 200 is shown in, for example, an airfoil 150, 176 of blade 132 and nozzle 126 in FIGS. 3 and 4, respectively, metal coupon 200 can be in any part of body 206 of component 202. Additively manufactured (AM) metal coupon 200 includes first section 292 and stress-relief section 294, and may take any form including but not limited to the ones described herein relative to FIGS. 7A-L. Braze material 310 couples metal coupon 200 in coupon opening 204 in body 206. As shown in FIGS. 9A-B, braze material 310 may simply surround metal coupon 200 and couple it in coupon opening 204. As shown in FIGS. 7F, 7H, 7J and 9C, braze material 310 may also infiltrate any stress-relief section 294 having porous region or sub-section 300 thereof extending to exterior surface 308 of metal coupon 200. As noted, the porosities of different porous regions or sub-sections, e.g., 300A-B, and 300D in FIGS. 7J and 9C, may be different in terms of at least one of the following characteristics: percentage of open space volume to total volume, pore shape, pore size, number of pores, or pore connecting passages. Body 206 and first section 292 may have a porosity different than any of stress-relief section 294, i.e., porous regions or sub-sections 300. More particularly, body 206 and first section 292 may have a porosity denser than any porous regions 300, e.g., they can be 100% solid.

Braze material 310 infiltrates into stress-relief section 294 based at least on a characteristic of the respective porosity. "At least on a characteristic" of the porosity indicates the porosity can result in different infiltration characteristics, such as braze material volume, pattern within the porosity, crystallization, among other characteristics. However, as understood in the art, other factors can also impact the infiltration characteristics such as the type of braze material and characteristics of the brazing process such as but not limited to: temperature, pressure, positioning of component 202 and metal coupon 200. The consequence of the different porosities is that different porous regions or sub-sections 300 at exterior surface 308 of metal coupon 200 braze material(s) 310 therein have at least one different physical characteristic. The porosities can be customized to select those physical characteristics inasmuch as the porosities can impact those physical characteristics. In one example, as shown in FIG. 9C, the porosity of porous region or sub-section 300A may be higher (i.e., less dense) than the porosity of porous region or sub-section 300B. The porosity of porous region or sub-section 300B may be higher (i.e., less dense) than the porosity of porous region or sub-section 300D. Hence, porous region or sub-section 300A includes more braze material 310 therein than porous region or sub-section 300B. Further, porous region or sub-section 300B may include more braze material 310 therein than porous region or sub-section 300D. In another example, porous region or sub-section 300A and/or 300D is in at least part of edge 308 of metal coupon 200 configured for joining to body 206. Porous region or sub-section 300B may be adjacent to porous region or sub-section 300A. This arrangement, as shown in FIG. 9C, may be advantageous to place more braze material 310 near a braze joint 334 to strengthen the joint adhesive bond strength of metal coupon 200 in coupon opening 204 in body 206, or it may allow for less oxidation at braze joint 334 or greater thermal conductivity, tensile strength, ductility, and/or fatigue strength at braze joint 334. In any event, stress-relief sections 294A-B and 294D relieve stress where they are located, e.g., at a nearby high-stress zone 296 (FIGS. 7I-J). Any of the physical characteristics described herein can also be customized based on the different porosities and/or different braze materials. As noted, depending on the braze material 310 used, the different porosities may allow for customization of physical characteristic(s) of component 202, such as: joint adhesive bond strength, stress (strain) relief and/or resistance, wear resistance, oxidation resistance, thermal conductivity, tensile strength, ductility, fatigue strength, electrical conductivity, surface roughness, hardness, and/or mass. As noted, metal coupon 200 may have a near net shape of coupon opening 204 in body 206 of component 202. As shown in FIG. 8C, metal coupon 200 may optionally include cooling passage(s) 320 therein. Cooling passage(s) 320 are defined in metal coupon 200 and may extend through exterior surface 325 of the metal coupon.

While particular locations of different stress-relief sections 294 and related porous regions 300 have been illustrated herein, it is emphasized that the different stress-relief sections and porous regions can be arranged in any manner to provide different stress relief and/or braze material infiltration characteristics and related different physical characteristics for component 202.

Embodiments of the disclosure may also include, as shown in FIGS. 1-2, turbomachine 100 including turbine assembly 110, and at least one component 202, as described herein. Component(s) 202 may take the form turbine stationary nozzle(s) 126, turbine rotating blade(s) 132 or other components of turbomachine 100. Metal coupon 200 can be used in a newly manufactured component or in a component in need of repair or improvements.

The disclosure provides various technical and commercial advantages, examples of which are discussed herein. For repairs or improvements of components, additive manufacturing allows cost-effective creation of metal coupons with custom-fitted shapes where only damaged material needs to be removed. Porous region(s) may provide a higher percentage of a base metal alloy (e.g., >60%) in certain areas that may result in improved physical characteristics compared to, e.g., pre-sintered preforms. Porous regions may also provide a welded/fused particle matrix (e.g., with a superalloy metal base) with braze material fill which is stronger compared to conventional metal particles surrounded by braze material. Multi-flow paths of the braze material using porous regions may also decrease the likelihood of a lack of fill and/or voids along a brazed joint compared to the conventional narrow gap-filling brazing process. Porous regions can be formed with differences in porosity across metal coupon to allow for highly customized braze material flow and stress relief. Porous regions also accommodate greater joint gap dimensional variance compared to machined solid coupons with narrow gaps for braze material. Repairs using the teachings of the disclosure are stronger than traditional narrow gap brazing processes, do not require certain post-repair finishing, yet provide improved physical characteristics compared to current techniques, such as pre-sintered preforms (PSPs). Stress-relief sections with porous region(s) allow stress (strain) relief and/or resistance improvements compared to coupons without such sections.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A metal coupon, comprising:

an additively manufactured (AM) metal member including a first section having a first porosity and a stress-relief section, wherein the stress-relief section includes a porous region having a second porosity, wherein the second porosity is between 2% to 50% open space volume to total volume of the porous region of the stress-relief section, wherein the first porosity is less than the second porosity, wherein the stress-relief section has less cross-sectional area than the first section, wherein the stress-relief section is at least partially embedded within the AM metal member; and wherein the stress-relief section has at least one of thermal conductivity, tensile strength, ductility, or fatigue strength less than at least one respective thermal conductivity, tensile strength, ductility, or fatigue strength of the first section.

2. The metal coupon of claim 1, wherein the stress-relief section is fully embedded within the AM metal member.

3. The metal coupon of claim 1, wherein the stress-relief section includes a first portion embedded within the first section and a second portion that extends to an exterior surface of the AM metal member.

4. The metal coupon of claim 1, wherein the stress-relief section is within a single layer of the AM metal member.

5. The metal coupon of claim 4, wherein the single layer of the AM metal member extends only partially across the AM metal member.

6. The metal coupon of claim 1, wherein the stress-relief section extends at least partially across at least two layers of the AM metal member.

7. The metal coupon of claim 1, wherein the porous region is a first porous region, the stress-relief section includes a first sub-section having the first porous region and a second sub-section having a second porous region, the first porous region having a respective porosity between 2% to 50% open space volume to total volume of the first porous region and the second porous region having a respective porosity between 2% to 50% open space volume to total volume of the second porous region, and wherein the porosity of the first porous region is less than the porosity of the second porous region; and wherein the first sub-section and the second sub-section have a difference between at least one of respective thermal conductivity, respective tensile strength, respective ductility, or respective fatigue strength.

8. A metal coupon, comprising:

an additively manufactured (AM) metal member including a first section that has a first porosity and a stress-relief section that includes a porous region that has a second porosity, wherein the second porosity is between 2% to 50% open space volume to total volume of the porous region of the stress-relief section, wherein the first porosity is different than the second porosity; and wherein the AM metal member further comprises a braze material that alters the at least one of thermal conductivity, tensile strength, ductility, or fatigue strength responsive to the braze material being infiltrated into the stress-relief section.

9. The metal coupon of claim 8, further comprising a crack in the first section and wherein the crack stops at the stress-relief section responsive to the braze material infiltrating the crack.

10. The metal coupon of claim 8, wherein the stress-relief section includes a first portion embedded within the first section and a second portion that extends to an exterior surface of the AM metal member.

11. The metal coupon of claim 10, further comprising a crack in the first section, wherein the crack stops at the stress-relief section responsive to the braze material infiltrating the crack.

12. A component, comprising:

a body;

an additively manufactured (AM) metal coupon including a first section that has a first porosity and a stress-relief section that includes a porous region that has a second porosity, wherein the second porosity is between 2% to 50% open space volume to total volume of the porous region of the stress-relief section, wherein the second porosity is higher than the first porosity, wherein the stress-relief section has less cross-sectional area than the first section, wherein the stress-relief section has at least one of thermal conductivity, tensile strength, ductility, or fatigue strength less than at least one respective thermal conductivity, tensile strength, ductility, or fatigue strength of the first section; and a braze material coupling the AM metal coupon to a coupon opening in the body.

13. The component of claim 12, wherein the braze material infiltrates into the stress-relief section and the at least one of thermal conductivity, tensile strength, ductility, or fatigue strength of the stress-relief section is altered responsive to infiltration by the braze material.

14. The component of claim 13, further comprising a crack in the first section, wherein the crack stops at the stress-relief section, wherein the braze material infiltrates the crack.

15. The component of claim 12, wherein the stress-relief section is fully embedded within the AM metal coupon.

16. The component of claim 12, wherein the stress-relief section includes a first sub-section embedded within the first section and a second sub-section that extends to an exterior surface of the AM metal coupon.

17. The component of claim 16, further comprising a braze material infiltrated into the stress-relief section and the at least one of thermal conductivity, tensile strength, ductility, or fatigue strength of the stress-relief section is altered responsive to infiltration by the braze material.

18. The component of claim 17, further comprising a crack in the first section, wherein the crack stops at the stress-relief section, wherein the braze material infiltrates the crack.

19. The component of claim 12, wherein the stress-relief section is within a single layer of the AM metal coupon.

20. The component of claim 19, wherein the single layer of the AM metal coupon extends only partially across the AM metal coupon.

21. The component of claim 12, wherein the stress-relief section extends at least partially across at least two layers of the AM metal coupon.

* * * * *